US012358287B2

(12) United States Patent
Pourtier et al.

(10) Patent No.: US 12,358,287 B2
(45) Date of Patent: Jul. 15, 2025

(54) CLEANING PROCESS FOR THE HYDRAULIC CIRCUIT OF AN INK JET PRINTER

(71) Applicant: DOVER EUROPE SÁRL, Vernier (CH)

(72) Inventors: Francis Pourtier, Charmes sur Rhône (FR); Bruno Barbet, Etoile sur Rhône (FR); Raphael Savoldi, Portes-les Valence (FR); Rudy Joly, La Rochede Glun (FR)

(73) Assignee: DOVER EUROPE SÀRL, Vernier (CH)

(*) Notice: Subject to any disclaimer, the term of this patent is extended or adjusted under 35 U.S.C. 154(b) by 0 days.

(21) Appl. No.: 17/646,303

(22) Filed: Dec. 29, 2021

(65) Prior Publication Data

US 2022/0203687 A1 Jun. 30, 2022

(30) Foreign Application Priority Data

Dec. 30, 2020 (EP) .................................... 20306712

(51) Int. Cl.
*B41J 2/165* (2006.01)

(52) U.S. Cl.
CPC ....... *B41J 2/16523* (2013.01); *B41J 2/16526* (2013.01)

(58) Field of Classification Search
None
See application file for complete search history.

(56) References Cited

U.S. PATENT DOCUMENTS

| | | | | |
|---|---|---|---|---|
| 2005/0248608 | A1* | 11/2005 | DeVivo | B41J 2/175 347/28 |
| 2010/0045753 | A1 | 2/2010 | Barbet | |
| 2010/0304028 | A1* | 12/2010 | Sowinski | C09D 11/322 427/256 |
| 2012/0281047 | A1 | 11/2012 | Barbet | |
| 2012/0299989 | A1 | 11/2012 | Prothon et al. | |
| 2013/0307891 | A1 | 11/2013 | Brabet et al. | |
| 2018/0119324 | A1* | 5/2018 | Long | B01D 46/71 |
| 2018/0281434 | A1* | 10/2018 | Shimizu | B41J 2/17546 |

(Continued)

FOREIGN PATENT DOCUMENTS

| | | | |
|---|---|---|---|
| EP | 2978606 | A1 | 2/2016 |
| EP | 3093144 | A1 | 11/2016 |

(Continued)

OTHER PUBLICATIONS

European Search Report for application No. EP 20306712 dated Jun. 11, 2021.

*Primary Examiner* — Alejandro Valencia
(74) *Attorney, Agent, or Firm* — McDonald Hopkins LLC

(57) ABSTRACT

A cleaning process for cleaning at least one part of a hydraulic circuit of a continuous inkjet printer. The hydraulic circuit includes a solvent tank and an ink tank, and hydraulic connections for sending ink and/or solvent to a print head. The cleaning process includes: a preliminary step of flushing or cleaning at least part of the ink or hydraulic circuit; and flowing or circulating the gas, and solvent, through at least one part of the hydraulic circuit and recovering dirty fluid from the at least one part of the hydraulic circuit in a recovery cartridge or in a tank.

13 Claims, 17 Drawing Sheets

(56) References Cited

U.S. PATENT DOCUMENTS

| | | | | |
|---|---|---|---|---|
| 2019/0143704 | A1* | 5/2019 | Smith | B41J 2/17543 347/14 |
| 2020/0207991 | A1 | 7/2020 | Joly et al. | |
| 2021/0187947 | A1 | 6/2021 | Barbet et al. | |
| 2021/0394508 | A1 | 12/2021 | Barbet et al. | |

FOREIGN PATENT DOCUMENTS

| | | | |
|---|---|---|---|
| EP | 3587122 | A1 | 1/2020 |
| FR | 2906755 | | 4/2008 |
| FR | 2952851 | A1 | 5/2011 |
| FR | 2954216 | A1 | 6/2011 |
| FR | 2971199 | A1 | 8/2012 |
| GB | 2447919 | A | 10/2008 |
| WO | 2008040777 | A1 | 4/2008 |
| WO | 2009049140 | A1 | 4/2009 |
| WO | 2011061331 | A1 | 5/2011 |
| WO | 2011076810 | A1 | 6/2011 |
| WO | 2012107461 | A1 | 8/2012 |
| WO | 2016205168 | A2 | 12/2016 |

* cited by examiner

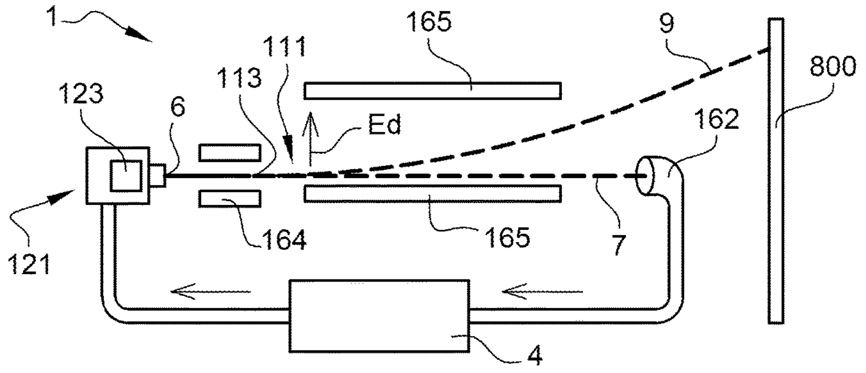
FIG.9
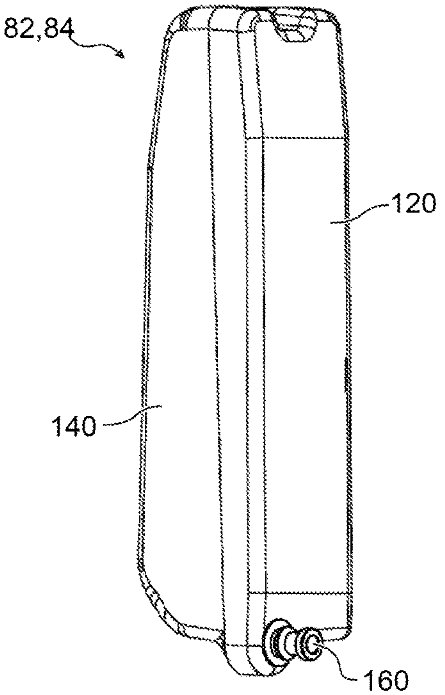
FIG.10
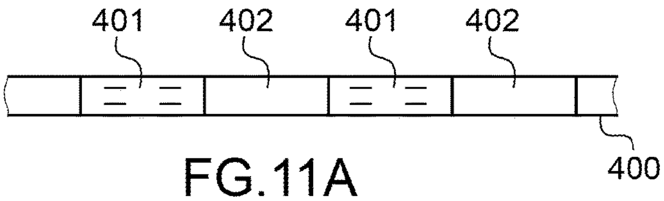
FG.11A
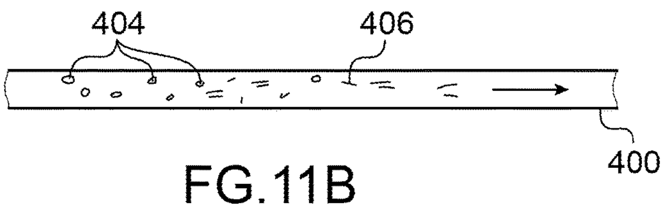
FG.11B

CLEANING PROCESS FOR THE HYDRAULIC CIRCUIT OF AN INK JET PRINTER

CROSS-REFERENCE TO RELATED APPLICATIONS

This application claims priority from European Patent Application No. 20306712.9 filed on Dec. 30, 2020. The content of this application is incorporated herein by reference in its entirety.

TECHNICAL FIELD AND PRIOR ART

The invention concerns the field of continuous inkjet printers (CU).

It concerns a new cleaning process of CIJ printers.

It also concerns a new architecture (arrangement of the ink circuit) of CIJ printers, in particular the arrangement of the ink circuit, for the purpose of increased flexibility.

Continuous inkjet printers (CU) are well known in the field of industrial coding and labelling of various products, for example to mark barcodes or expiry dates on food items directly on the production line and at fast production rate. This type of printer is also found in some fields of design in which use is made of the graphic printing possibilities of the technology.

There is a need for a process to clean an ink circuit of CIJ printers, so that individual components or parts of its ink circuit can be easily disassembled or removed from the ink circuit, for example when they must be repaired or replaced by other components or parts, while minimizing risks of spillage or dropping, in particular of ink. Such process must be able to be carried out by an operator without any particular training.

One particular problem arises when a component or a part of a known printer, for example a valve, must be replaced. Said part is first disassembled from the printer and stoppers are mounted on the hydraulic conduits from which the part was removed and possibly also on the removed part itself, which is time consuming and costly. Alternatively, non-return valves or check valves can be used in the circuit, but they are also costly. Furthermore, the removed part remains dirty and/or is not dry, which causes important ink and/or solvent spills; for this reason, it is sometimes introduced into an airtight bag to be transported, which is not satisfactory since the removed part often remains dirty and retains a lot of residual fluid.

There is also a need, for environmental reasons, to collect the used components or parts of such machines and to recycle or refurbish or evacuate them to waste stations with minimum spillage and dropping. A process must therefore be found to clean an ink circuit of a CIJ printer, so that, after use, clean individual components or parts of said circuit can be easily recycled and/or refurbished and/or transported to a repair station or to a collecting or waste station.

There is also a need for a process to clean an ink circuit of a CIJ printer, so that clean and dry or nearly dry individual components or parts of said circuit can be easily removed and then transported with minimum risks of ink and/or solvent spillage. There is also a need for an ink circuit of a CIJ printer to implement a new cleaning process according to the above requirements.

There is also a need for an ink circuit architecture of such CIJ printers which minimizes the number of components whilst guaranteeing great flexibility and reliability, ease of cleaning and/or maintenance to allow rapid servicing, minimizing risks of spillage and able to be carried out by an operator without any particular training.

There is also a need for components for such an ink circuit which can be easily cleaned and/or removed from said ink circuit for example when they must be repaired or replaced by other components.

There is a further need for an ink circuit architecture of such CIJ printers which can be modulated or tailored depending on the needs and/or on the kind of printing which must be performed; preferably, such an ink circuit architecture has one or more parts or modules which can be adapted or changed, in particular when manufacturing or building the CIJ printer which comprises said ink circuit architecture.

SUMMARY OF THE INVENTION

The invention concerns a method or process for flushing or cleaning an ink circuit of a CIJ printer or at least part of said ink circuit, for example an ink circuit as disclosed below; such a circuit may comprise at least one single-block assembly or module.

In an embodiment, said method comprises flushing or cleaning at least said part of the ink or hydraulic circuit of an ink jet printer, or said ink or hydraulic circuit, with a gas, for example with air. Gas is circulated or flowed, in said circuit or in at least part of it, and removes ink from the part in which it is circulated or flowed.

Thus, there is no residual ink in the circuit or in at least part of it. This avoids the risks of spillage or dropping of ink.

Ink can be recovered, for example in a recovery cartridge or in a tank or in the main ink tank of the ink circuit. Ink can thus be reused and is not wasted.

The invention also concerns a cleaning or flushing method or process for cleaning or flushing at least an ink or hydraulic circuit of a continuous inkjet printer or at least one part of said circuit, said hydraulic circuit comprising for example a solvent tank and an ink tank and hydraulic connection or means for sending ink and/or solvent to a print head.

In an embodiment, said cleaning or flushing process comprises circulating or flowing, for example pumping, a gas or a gas and solvent or clean solvent, through said circuit or at least one part of said hydraulic circuit and possibly recovering dirty fluid from said circuit or from at least one part of said hydraulic circuit, said dirty fluid comprising a mixture of solvent and ink.

Said process may comprise alternatively or simultaneously circulating or flowing, through said at least one part of said hydraulic circuit or through said circuit, for example by pumping said solvent, for example from said solvent reservoir, and said gas, for example between 80% and 95% of solvent and 20% to 5% of gas.

If said hydraulic circuit comprises a solvent pump for pumping solvent and/or a pressure pump for pumping ink from said ink tank, said circulating or flowing of gas or of gas and solvent can implement pumping of gas and/or solvent and can be performed with one or both of said solvent pump and/or said pressure pump. Gas under pressure (at a pressure higher than the atmospheric pressure) can be directly introduced into the circuit, and in particular into a flow of solvent, without pumping said gas.

Said step of circulating or flowing a gas and solvent in an embodiment of a process according to the invention for example comprises alternatively sending or circulating or flowing several volumes of gas and solvent, forming for example a slug flow, and/or forming a mixture of solvent and gas, forming, or not, a diphasic mixture or an emulsion, said flow or mixture or emulsion comprising for example between 80% and 95% of solvent and 20% to 5% of gas. A slug flow comprises several volumes of solvent, two successive such volumes being separated by one volume of gas.

A cleaning process according to the invention may comprise:

- pumping gas at atmospheric pressure from upstream of a pump;
- or injecting compressed gas, for example from a compressor, and/or for example from downstream of a pump.

An embodiment, in which said flushing or cleaning process comprises circulating or flowing a gas and clean solvent through said circuit or at least one part of said hydraulic circuit, can comprise at least one of:

- before circulating or flowing a gas and clean solvent: a preliminary step of flushing or cleaning at least said part of the ink or hydraulic circuit, or said ink or hydraulic circuit, only with a gas, for example with air; gas is circulated in said circuit or in at least part of it, and removes ink from the part in which it is circulated; thus, there is no residual ink in the circuit or in at least part of it. This avoids the risks of spillage or dropping of ink, which can be recovered, for example in a recovery cartridge or in a tank or in the main ink tank of the ink circuit. Ink can thus be reused and is not wasted;
- after, or further to, circulating or flowing a gas and solvent or clean solvent: recovering dirty fluid in a tank. Said dirty fluid can be reused, for example at least part of it can be reinjected into said ink tank when there is a need to dilute the ink of said ink tank.

In a flushing or cleaning process according to the invention, gas, for example compressed gas (at a pressure higher than atmospheric pressure) can be introduced into the ink circuit, for example alternatively or simultaneously to solvent, through a dedicated inlet in the circuit, for example upstream or downstream of one of the pump(s) of the circuit.

Said hydraulic circuit to which the invention applies can comprise a solvent pump for pumping solvent and an ink pump (or a pressure pump) for pumping ink from said ink tank, pumping of gas and solvent according to an embodiment of the invention being performed with one or both of said solvent pump and said ink or pressure pump.

In an embodiment, said hydraulic circuit to which the invention applies comprises at least an ink cartridge and a solvent cartridge, said flushing or cleaning process comprising at least one of:

- unplugging said solvent cartridge from a solvent cartridge connection or receiving portion and pumping air, instead of solvent, from said solvent cartridge connection or receiving portion; said air can be used in a flushing or cleaning process according to the invention;
- unplugging said ink cartridge from an ink cartridge connection or receiving portion, and possibly replacing said ink cartridge with a recovery cartridge in which dirty fluid can be recovered.

In a particular embodiment, a flushing or cleaning process according to the invention may comprise a preliminary step of mounting a device in the circuit for introducing a gas, for example compressed gas, into said circuit, said cleaning process comprising circulating or flowing said gas and solvent in or through at least one part of said hydraulic circuit.

A flushing or cleaning process according to the invention may comprise or end with a drying step of said at least one part of a hydraulic circuit or of said circuit. Said drying step for example comprises sending or circulating or flowing a flow of gas, which may be heated, through said hydraulic circuit or through said at least one part of said hydraulic circuit.

In a particular embodiment, said hydraulic circuit comprises at least one removable single-block assembly or removable module or removable component, said flushing or cleaning process comprising cleaning said at least one removable single-block assembly or module or component. A drying step as mentioned above is particularly useful in this case, for example if said single-block assembly or module or component must be disassembled from said circuit: a clean and dry or nearly dry single-block assembly or module or component can be removed from the circuit with minimum risk of ink or solvent spills and thus with a minimum risk to waste ink or solvent. The drying step of a single-block assembly or module or component may achieve removing at least 85% or 90% of the fluid (mostly solvent) from said assembly or module or component.

The invention also concerns a process for maintaining a hydraulic circuit of a continuous inkjet printer, or at least one part of said hydraulic circuit, which may comprise at least one removable single-block assembly (or removable block or removable module), said process comprising:

a)—performing a flushing or cleaning process according to any of the embodiments of the invention, whereby said at least one part of said hydraulic circuit, for example said at least one removable single-block assembly, is flushed or cleaned;

b)—disassembling or removing, and possibly replacing, said at least one part of said hydraulic circuit, for example said at least one removable single-block assembly.

The invention also concerns a continuous inkjet printer, comprising:

- an ink circuit,
- a printhead connected to the ink circuit via a flexible umbilical cable containing firstly hydraulic connection means to bring printing ink from the ink circuit to the print head and send ink to be recovered from the print head towards said ink circuit, and secondly electrical connection means;
- a controller controlling, or programmed to control, said hydraulic circuit to perform a flushing or cleaning process according to the invention or to circulate or flow gas and possibly solvent, through at least one part of said hydraulic circuit.

Preferably the controller is controlling, or programmed to control, said hydraulic circuit so as to perform at least one of the following:

- recovering ink in a tank, which can be the main ink tank of the circuit;
- recovering dirty fluid in a tank, which can be a dedicated tank, or in a cartridge or recovery cartridge.

Said CIJ printer can comprise a solvent pump for pumping solvent and/or an ink pump (or a pressure pump) for pumping ink.

Said CIJ printer can comprise at least an ink cartridge receiving portion or connection and/or at least a solvent cartridge receiving portion or connection.

Said ink circuit can comprise an inlet for introducing gas, for example compressed gas, into the ink circuit, for example in order to perform a cleaning step or process according to the invention.

Said ink circuit can comprise at least one removable single-block assembly (or removable block or removable module), as disclosed below, said controller controlling said hydraulic circuit to perform a process according to the invention, for example to circulate or flow at least gas, or to alternatively or simultaneously circulate or flow gas and solvent, through at least said removable single-block assembly.

In a continuous inkjet printer according to the invention, said controller may be programmed to control said hydraulic circuit to perform a drying step, for example by sending or circulating of flowing gas, for example heated gas, through the circuit.

Embodiments of a process according to the invention or of a CIJ printer according to the invention can implement at least one removable single-block assembly or removable block or removable module. Such single-block assembly may comprise at least one fluid component like for example at least one pump and/or at least one filter and/or at least one damper and/or at least one valve.

Said at least one removable single-block assembly or removable block or removable module can further comprise means, such as securing or fastening means, for mounting and disassembling said single-block assembly to and from an ink circuit of a CIJ printer.

Said at least one removable single-block assembly or removable block or removable module may comprise a housing having at least one fluid inlet and at least one fluid outlet, and fluid connection means, for example ducts, to allow fluid to flow from said at least one fluid inlet to said at least one fluid component, and then to said at least one fluid outlet.

Several examples of different such removable single-block assemblies (or removable blocks or removable modules) are a "first single-block assembly" (or "first block or module"), a "second single-block assembly" (or "second block or module"), a "third single-block assembly" (or "third block or module") which are described below. The adjectives "first", "second", "third" do not indicate a preferred order or any order of importance, but are merely used for the sake of clarity. Said different single-block assemblies or removable blocks or removable modules can be used independently from each other in a printer.

A first single-block assembly comprises:

a housing having at least one fluid inlet and at least one fluid outlet, a first pump or at least part of a first pump, for example at least part of its hydraulic portion;

fluid connection means to allow a fluid to flow from said at least one fluid inlet to said at least part of said first pump and then to said at least one fluid outlet, means, or securing or fastening means, for mounting and dismounting said first single-block assembly to and from said ink circuit.

In one embodiment said first single-block assembly comprises a hydraulic part of a pump, and coupling means for coupling said hydraulic part and a motor for driving said hydraulic part, said motor being in an ink circuit, outside said first single-block assembly. For example, said coupling means of said first single-block assembly comprises an axis of said pump, said axis traversing said housing.

A second single-block assembly comprises:

a housing having at least one fluid inlet and at least one fluid outlet, at least one first, or main, filter, fluid connection means to allow a fluid to flow from said at least one fluid inlet to said at least one first filter and to said at least one fluid outlet, means, or securing or fastening means, for mounting and disassembling said second single-block assembly to and from said ink circuit.

A third single-block assembly comprises:

a housing having at least one or two fluid inlets and at least one or two fluid outlets, at least one recovery device, fluid connection means to allow fluid to flow from said fluid inlet or from one of said at least two fluid inlets to said recovery device, and to said fluid outlet or to one of said at least two fluid outlets, means, or securing or fastening means, for mounting and disassembling said third single-block assembly to and from said ink circuit.

Said third single-block assembly may further comprise at least one filter, said fluid connection means allowing a fluid to flow from said fluid inlet or from one of said at least two fluid inlets to said filter, then to said recovery device, and to said fluid outlet or to one of said at least two fluid outlets.

Said recovery device of said third single-block assembly may comprise at least a second pump or a venturi.

Said third single-block assembly may further comprise at least a 3-way valve.

Any of said removable single-block assemblies or removable modules, for example any of said first, second, or third single-block assemblies, can comprise an identifier, for example of the electrical or of the magnetic type.

An electrical identifier can have for example an electrical characteristic having one of at least two or three values; it can have more values, for example if there are:

5 different first single-block assemblies for example as described above, for example having 5 different pumps, in which case the electrical identifier of the first single-block assemblies has at least 5 different values;

or 4 different second single-block assemblies, for example as described above, for example having 4 different filters, in which case the electrical identifier of the second single-block assemblies has at least 4 different values;

or 4 different third single-block assemblies, for example as described above, for example having four different recovery devices, in which case the electrical identifier of the third single-block assemblies has at least 4 different values.

A magnetic identifier can comprise at least one magnet disposed at one or more specific location(s) or position(s) in the single-block assembly, said specific location(s) or position(s) depending on at least one technical characteristic of the single-block. A magnetic identifier comprising one magnet can have for example at least two or three different positions in the device, each position identifying for example a different type of pump or a different type of filter or a different type of recovery device. It can have more possible positions, for example if there are:

5 different first single-block assemblies, for example as described above, for example having 5 different pumps, in which case the magnetic identifier of the first single-block assemblies has at least 5 different positions;

or 4 different second single-block assemblies, for example as described above, for example having different filters, in which case the magnetic identifier of the second single-block assemblies has at least 4 different positions;

or 4 different third single-block assemblies, for example as described above, for example having four different recovery devices, in which case the magnetic identifier of the third single-block assemblies has at least 4 different positions.

A magnetic identifier can cooperate with means in the circuit, for example a switch, for example a "reed switch", to identify the removable single-block assembly or the removable module. Several switches can be located at different locations in the ink circuit. Depending on the location of the magnet in the module, which itself depends on one or more technical characteristics of the module, one or the other of the switches is activated when the module is connected to the circuit, which is detected by the printer or its controller. An identification of the module is thus obtained.

An identifier of a module can comprise several magnets disposed at several locations in the module or single-block, each combination of locations depending on at least one technical characteristic of the module or single-block; for example, each combination of locations provides the identification of a different type of pump or a different type of filter or a different type of recovery device and each magnet interacting with means in the circuit, for example a switch, for example a "reed switch". This multiplies the possible identifications with respect to the identifications with only one magnet.

Any of said removable single-block assemblies or removable modules, for example any of said first, second, or third single-block assemblies can comprise means, preferably magnetic means, for guiding its positioning in a printer or with respect to an ink circuit or to a corresponding interface in the printer. Any removable component or part of the circuit can also be provided with such magnetic guiding means.

In an embodiment, at least one of said removable single-block assemblies or removable modules, for example any of said first, second, or third single-block assemblies, as well as the corresponding part of the printer to which it must be connected, have magnetic means that cooperate to attract each other when said single-block assembly or module approaches the location in the printer where it must be connected so that it is easier for an operator to mount said assembly or module.

For example, each of said at least one single-block assembly and the corresponding connecting part or surface of the printer to which it must be connected has a magnet, both magnets attracting each other. Or one of them has a magnet and the other part has a material having magnetic properties such that both the assembly and the corresponding connecting part of the printer attract each other when the module approaches said connecting part. Other components or parts of the circuit can be mounted on or in the circuit, the mounting being assisted or guided by magnetic means as described above.

Further aspects and embodiments of the above described single-block assemblies or modules or blocks are disclosed in the following parts and in the drawings of this application.

In an embodiment, of a process according to the invention or of a CIJ printer according to the invention, an ink circuit of said continuous inkjet printer comprises one or more of the above described removable single-block assemblies or removable modules, for example one or more of said first, second, or third single-block assemblies. Any of said removable single-block assemblies or removable modules, for example any of said first, second, or third single-block assemblies can be mounted in or on the ink circuit or disassembled or removed from the ink circuit, for example after a flushing or cleaning process according to the invention, independently from the others.

An ink circuit of a continuous inkjet printer to which the invention can apply or an ink circuit of a continuous inkjet printer according to the invention, can comprise:

- a first part comprising means, in particular one or more hydraulic components and/or at least part of a hydraulic circuit, for providing a print head of said CIJ printer with ink and solvent;
- a second part of said ink circuit comprising at least one removable single-block assembly or module according to the invention; said at least one removable single-block assembly can be for example selected among the above described first single-block assembly, second single-block assembly and third single-block assembly; in a more particular embodiment, said second part of said ink circuit comprises 3 different single-block assemblies, namely a first single-block assembly according to one of the above described embodiments, a second single-block assembly according to one of the above described embodiments and a third single-block assembly according to one of the above described embodiments.

Said circuit may further comprise means for mounting and disassembling said at least one single-block assembly or module to and from the first part of said ink circuit, for example to and from at least one corresponding receiving interface. A receiving interface may have at least one fluid inlet and/or at least one fluid outlet which correspond(s) to the at least one fluid outlet(s) and/or to the at least one fluid inlet(s) of the single-block assembly or module which must be mounted or assembled with said interface.

If the ink circuit has several different single-block assemblies or modules, each of them can be disassembled or removed from said ink circuit, for example after a flushing or cleaning process according to the invention, independently from the other(s) and can be mounted back (for example after a cleaning or repairing step) or replaced with a different or similar or identical module. For example, a recovery module can be replaced by a recovery module having a different structure and/or one or more different component(s), in particular if a different ink is used in the printer. Another example can be the replacement of a module by a technically updated module, with more advanced technical function(s) or updated component(s).

A different or updated component(s) can be for example a different or more advanced filter (having a different, for example a smaller, mesh size than the previous one) and/or a different pump (having a different, for example a larger, flow rate or power, than the previous one) and/or pumps differing by their technology (a gear pump or a peristaltic pump or a diaphragm pump, which can be adapted to different types of inks) and/or a different pump or venturi (having a different, for example larger, geometry than the previous one).

An ink circuit to which the invention applies, or an ink circuit of a continuous inkjet printer according to the invention, may be compatible with a plurality of the above-described modules, for example with two different third single block assemblies; at least two of said modules, although they may differ from each other by one or more technical features, for example different filters, may be alternatively mounted on said circuit or printer, or on the same corresponding interface of said circuit. Said circuit or interface has connections (at least one fluid inlet and/or at least one fluid outlet) so that said at least two different modules (different modules having different structure(s)

and/or one or more different component(s) as explained above) can be alternatively connected to said circuit or printer or to said corresponding interface, the exchange of module occurring for example after a flushing or cleaning process according to the invention.

The invention applies in particular to an ink circuit of a continuous inkjet printer or to a continuous inkjet printer, or a continuous inkjet printer which can comprise, or a continuous inkjet printer according to the invention can comprise:

- a first part comprising means for providing a print head of said CIJ printer with ink and solvent;
- a second part of said ink circuit comprising a first single-block assembly or module comprising at least a first pump, or at least part of a first pump and a second single-block assembly or module, different from said first single-block assembly or module, comprising at least one filter, and each of said single-block assemblies or modules further comprising:
- a housing having at least one fluid inlet and at least one fluid outlet,
- fluid connection means to allow fluids to flow from said at least one fluid inlet to said at least part of a first pump or to said filter and to said at least one fluid outlet,
- means for mounting and disassembling said first single-block assembly and said second single-block assembly to and from said first part of said ink circuit, for example to and from a first receiving interface and a second receiving interface of said first part.

Such an ink circuit may further comprise a third single-block assembly or module as disclosed above.

As already explained above, any single-block assembly of an ink circuit to which the invention may apply, in particular any of the first, second or third single-block assembly or module, may comprise at least one identifier, for example of the electrical or of the magnetic type. Said identifier may cooperate with corresponding means in the ink circuit to read said identifier.

As already explained, said first single-block assembly may comprise a pump or at least a hydraulic part of a pump, and coupling means for coupling said hydraulic part of a pump and a motor for driving said hydraulic part. Said motor of said first single-block assembly may be in the ink circuit, outside said first single-block assembly, said coupling means coupling said motor and said pump.

Said coupling means of said first single-block assembly may comprise an axis of said pump, said axis traversing said housing.

The means for mounting and disassembling any of said single-block assemblies or any single block assembly of an ink circuit to which the invention applies:

- may allow a rotation of the single-block assembly to be performed about a pivot pin;
- and/or may comprise means for locking said single-block assembly in a fixed position with respect to said circuit or to a receiving interface of said circuit.

The invention also concerns a process for maintaining a hydraulic circuit of a continuous inkjet printer, comprising a solvent tank or reservoir and a main tank for ink, and at least one removable single-block assembly among:

- a first removable single-block assembly comprising at least part of a first pump; it is for example a first single-block assembly as disclosed above;
- a second removable single-block assembly (30) comprising at least one filter; it is for example a second single-block assembly as disclosed above;
- a third removable single-block assembly comprising at least a recovery device; it is for example a third single-block assembly as disclosed above,
- a flushing or cleaning process, for example according to the invention, flushing or cleaning at least one of said first removable single-block assembly, said second removable single-block assembly and a third removable single-block assembly;
- and said process further comprising removing and replacing at least one of said first removable single-block assembly, said second removable single-block assembly and said third removable single-block assembly. Said removed single-block assembly can be replaced with a different or similar or identical module. For example, a recovery module can be replaced by a recovery module having a different structure and/or one or more different component(s), in particular if a different ink is used in the printer. Another example can be the replacement of a module by a technically updated module, with more advanced technical function(s) or updated component(s). A different or updated component(s) can be for example a different or more advanced filter (having a different, for example a smaller, mesh size than the previous one) and/or a different pump (having a different, for example a larger, flow rate or power, than the previous one) and/or pumps differing by their technology (a gear pump or a peristaltic pump or a diaphragm pump, which can be adapted to different types of inks) and/or a different pump or venturi (having a different, for example larger, geometry than the previous one).

BRIEF DESCRIPTION OF THE FIGURES

FIG. 9 is a scheme of a printing head of a deviated continuous jet printer which can be implemented in the present invention or to which the invention may apply.

FIG. 10 shows an example of a CIJ printer cartridge.

FIGS. 11A and 11B show different kinds of mixtures of gas and solvent circulating in a duct in embodiments of a process according to the invention.

DETAILED DESCRIPTION OF EMBODIMENTS

Figure 5A:
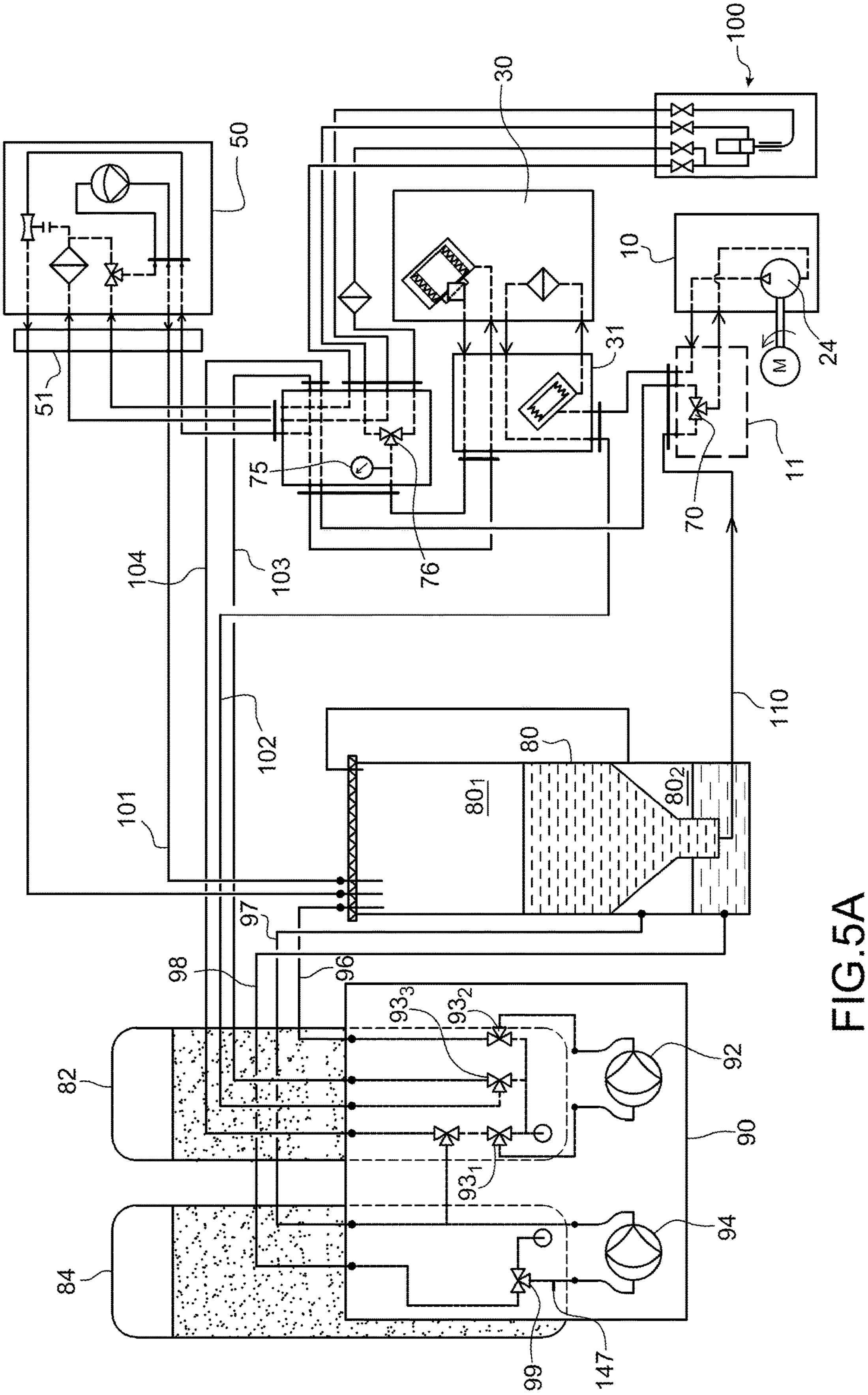
FIGS. 5A and 5B show fluid circuits, each comprising a set of a pump module, a filter module and a recovery (or vacuum) module, said fluid circuits being according to embodiments of the invention or being able to be used in embodiments of the invention.

An example of circuit, and of components of such a circuit, to which the invention can be applied is given on FIG. 5A.

Components for such a circuit are shown on FIGS. 1A-3F and are first described.

Figure 1A:
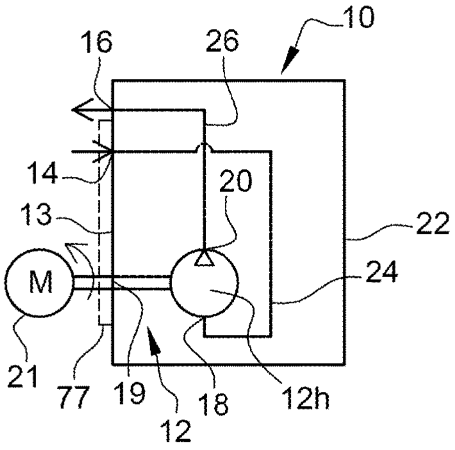
FIG. 1A is a schematic representation of a pump module which can be used in embodiments of the invention.

An example of a pump module (or ink pressure pump module) 10 is illustrated on FIG. 1A. It comprises a housing or support 22, possibly including a front side or cover 13; said module comprises a fluid inlet 14 and a fluid outlet 16; inside the module or its housing, at least the hydraulic part 12*h* of a pump 12 is connected to said fluid inlet and said fluid outlet. As illustrated on FIG. 1A:

- the motor 21 of the pump 12 can be located outside the pump module, because it is robust and sturdy; in such case, the axis 19 of the pump, which connects the motor and the hydraulic part, extends through the cover 13 of the pump module 10, only the hydraulic part of the pump being contained in housing 22; in a variant, the pump, including its hydraulic part and its motor is completely housed in the pump module;
- the pump inlet 18 and the pump outlet 20 can be directly connected to the fluid inlet 14 and the fluid outlet 16 by ducts 24, 26, the fluid circulating from said fluid inlet 14 to said pump 20 and then from said pump 20 to said fluid outlet 16; preferably no other fluidic element is present between the fluid inlet 14 and the pump inlet 18 and between the fluid outlet 16 and the pump outlet 20.

The pump illustrated on FIG. 1A comprises a hydraulic part 12*h*, a motor 21 and an axis 19 coupling said hydraulic part 20 and said motor 21; the pump can be of the magnetic type. Such a magnetic pump comprises a shell (part of which is referenced 12*m* on FIG. 1C) containing a hydraulic part, or impeller, coupled to a shaft which bears an inner magnetic ring; outside the shell, an outer magnetic ring is mounted on a drive shaft and is magnetically coupled to the inner magnetic ring through the shell. A motor can drive the drive shaft and the outer magnetic ring in rotation (the motor 21 and the outer magnetic ring 190 are visible on FIG. 4C); in turn, the outer magnetic ring drives the inner magnetic ring, and the impeller, in rotation because of the magnetic coupling. In case of a magnetic pump, the axis 19 of FIG. 1A is the drive shaft, the impeller and its shaft being housed in the housing 22.

The ink circuit has a receiving portion or zone or interface to receive the pump module and connect it to the hydraulic circuit of the printer. Said receiving portion or zone or interface has at least one fluid inlet (s) which corresponds to the fluid outlet 16 and at least one fluid outlet which corresponds to the fluid inlet 14 of said first single-block assembly, so that fluid can flow from said interface outlet into said first single-block assembly and then out of said first single-block assembly to said interface inlet.

An example of said receiving interface is described below.

The pump module can be mounted in or on the ink circuit or on said receiving portion or zone or interface; it can be disassembled from said circuit or from said receiving portion or zone or interface of the ink circuit. For example, one or more screw(s), or nut(s), or bolt(s), or clip(s), or clamp(s) or hook(s) or any other securing means can be used to mount and remove said module.

This pump module, like any other module in this application, can be provided with an identifier, for example an electric identifier or an RFID identifier or a magnetic identifier, to identify which embodiment is implemented, for example which pump is implemented in the module. Electric identifiers, RFID identifiers and magnetic identifiers are described below.

Figure 1B:
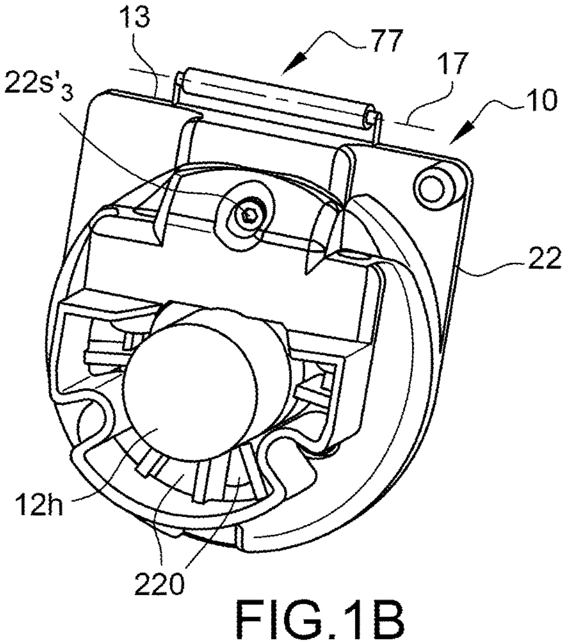
FIGS. 1B and 1C illustrate an embodiment of a pump module which can be used in embodiments of the invention.
Figure 1C:
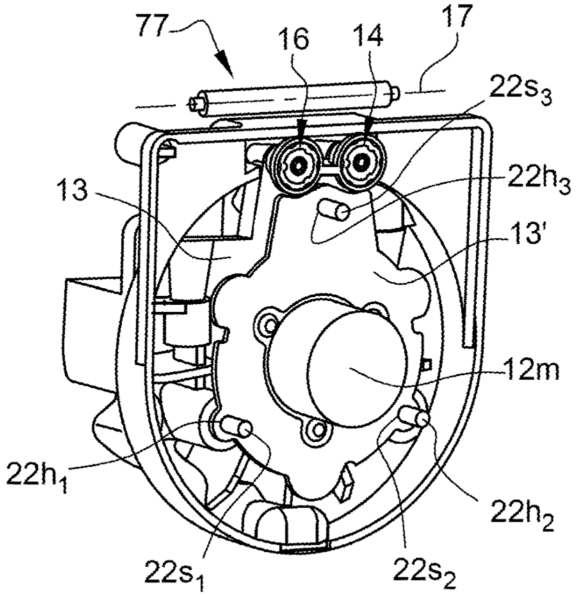

FIGS. 1B and 1C show an embodiment of a pump module (or ink pressure pump module) 10, in which the motor 21 of the pump 12 is located outside the pump module. The hydraulic part 12*h* of the pump is maintained between front cover 13 and a back cover 13' which can be demountable as can be seen on FIG. 1C. The hydraulic part 12*h* of the pump can be easily removed after back cover 13' is demounted. Reference 12*m* is for example the outer magnetic part of the pump, it is located outside of the housing 22.

As seen on FIG. 1B the back side of the housing of the pump module is not completely closed so that the pump 12 (or the part of the pump contained in the housing 22) can be cooled by air of the surrounding atmosphere.

The housing can be provided with slots or openings 22*o* to facilitate air circulation around the pump.

Any of the embodiments of this module can be provided with one or more member or means 77 to allow mounting and disassembling, as described below in connection with FIGS. 2C-2D. Said member or means 77 is represented on FIGS. 1A-1C, along axis 17 and positioned along a side of the housing 22 or of its cover. The remainder (or the other part) of the machine may comprise means (for example holes 770, 771, visible on FIG. 4D) to cooperate with retractable members or pins $\mathbf{77}_2$, $\mathbf{77}_3$ of said means 77.

In another embodiment, it is the remainder or the other part(s) of the machine which may comprise one or more members or pins $\mathbf{77}_2$, $\mathbf{77}_3$ (each cooperating with a spring), the module 10 being equipped with corresponding holes to cooperate with said members or pins.

In both embodiments the ink circuit has a receiving portion or zone or interface to receive the module, which can be mounted on and disassembled from said receiving portion or zone or interface, for example with one or more screw(s), or nut(s), or bolt(s), or clip(s), or clamp(s) or hook(s) or any other securing means. Hole $\mathbf{22}h_1$, $\mathbf{22}h_2$, $\mathbf{22}h_3$ are visible on FIG. 1C to accommodate screws $\mathbf{22}s_1$, $\mathbf{22}s_2$, $\mathbf{22}s_3$, one screw head $\mathbf{22}s'_3$ being visible on FIG. 1B.

Figure 2A:
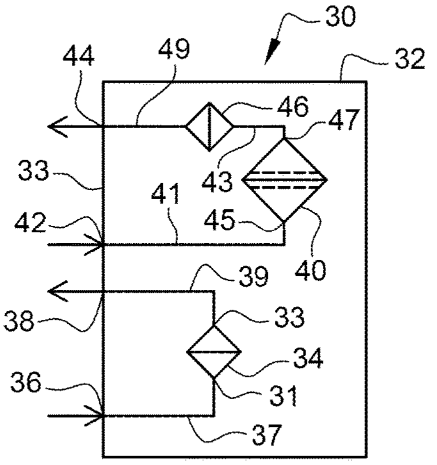
FIG. 2A-2B are schematic representations of a filter module which can be used in embodiments of the invention.

An example of a filter module 30 is illustrated on FIG. 2A. It comprises a housing 32, possibly including a cover 33; said module comprises one or more fluid inlet(s) 36, 42, and one or more fluid outlet(s) 38, 44; inside the module or its housing, one or two filter(s) 34 (a so-called "grid filter"), resp. 40 (a so-called "main ink filter") is/are connected to a corresponding set of fluid inlet 36, resp. 42 and fluid outlet 38, resp.44. As illustrated on FIG. 2A:

- the main filter inlet 45 and the main filter outlet 47 can be directly connected to the fluid inlet 42 and the fluid outlet 44 by one or two duct(s) 41, 43;
- another filter 46 can be connected between main filter outlet 47 and the fluid outlet 44;
- preferably, no other fluidic element is present between the fluid inlet 36, resp. 42 and the filter(s) inlet(s) 31, 45 and between the fluid outlet 38, resp. 44 and the filter(s) outlet(s) 33, 47.

Figure 2B:
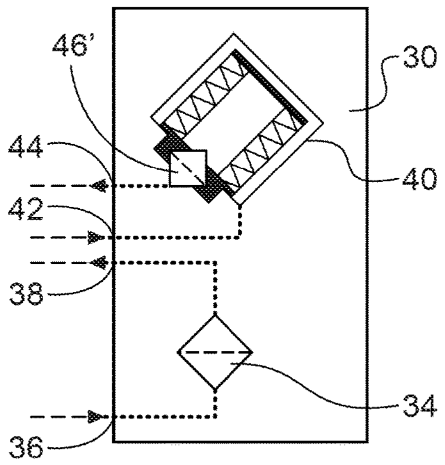

Another embodiment of the filter module 30' is illustrated on FIG. 2B. The reference numbers are the same as on FIG. 2A and designate the same elements, except for the filter 46 which is replaced by a filtering grid 46' at the outlet of the main filter 45.

The ink circuit has a receiving portion or zone or interface to receive the filter module and connect it to the hydraulic circuit of the printer. Said receiving portion or zone or interface has at least two fluid inlets which correspond to the fluid outlets 38 and 44 and at least two fluid outlets which correspond to the fluid inlets 36 and 42 of said second single-block assembly, so that fluid can flow from said interface outlet(s) into said second single-block assembly and then out of said second single-block assembly to said interface inlet(s). In a simpler embodiment, said module comprises one fluid inlet, one fluid outlet and one filter; the corresponding receiving portion or zone or interface to receive said filter module and connect it to the hydraulic circuit of the printer has one fluid inlet which corresponds to the fluid outlet of said module and one fluid outlet which corresponds to the fluid inlet of said module.

An example of said receiving interface is described below. The filter module can be mounted in or on the ink circuit or on said receiving portion or zone or interface; it can be disassembled from said circuit or from said receiving portion or zone or interface of the ink circuit. For example, one or more screw(s), or nut(s), or bolt(s), or clip(s), or clamp(s) or hook(s) or any other securing or fastening means can be used to mount and remove said filter module. Holes 32$h_1$, 32$h_2$, 32$h_3$, 32$h_4$ are visible on FIG. 2D to accommodate screws 32$s_1$, 32$s_2$, 32$s_3$, 32$s_4$, 3 screw heads 32$s'_1$, 32$s'_2$, 32$s'_3$ being shown on FIG. 2C.

This filter module, like any other module in this application, can be provided with an identifier, for example an electric identifier or an RFID identifier or a magnetic identifier, to identify which embodiment is implemented, for example which filter(s) is/are implemented in the module. Electric identifiers, RFID identifiers and magnetic identifiers are described below.

Figure 2C:
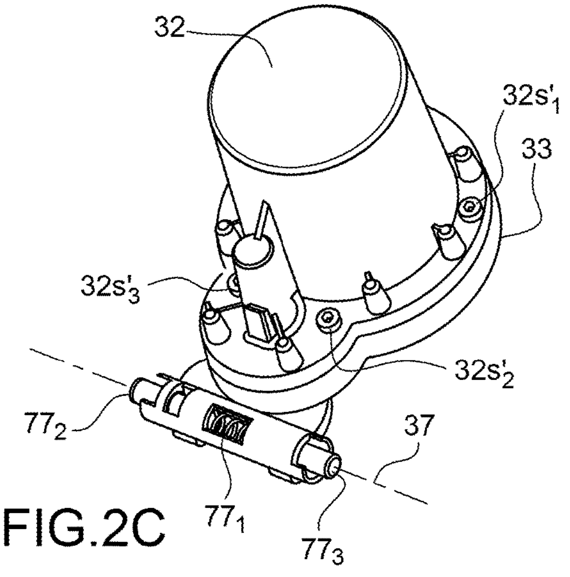
FIGS. 2C and 2D illustrate an embodiment of the housing of a filter module which can be used in the invention.
Figure 2D:
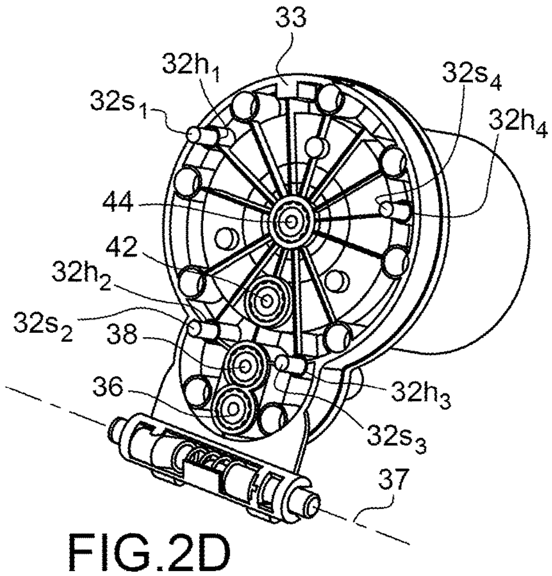

FIGS. 2C and 2D show an example of a filter module 30 which can be used in a method according to the invention. The module is preferably able to pivot or is rotatable around an axis (or hinge or pivot pin) 37.

Preferably the module is provided with means 77 to allow mounting and dismounting of the module 30. These means may allow the defining of axis (or hinge or pivot pin) about which the module is able to pivot. These means may be in the form of retractable members or pins 77$_2$, 77$_3$ returned by a spring 77$_1$.

For example, said means 77 comprise a cylinder, aligned along axis 37 (axis of rotation) and containing said retractable members or pins 77$_2$, 77$_3$ said spring 77$_1$. Spring 77$_1$ is located between both pins 77$_2$ and 77$_3$, and is able to be compressed in said cylinder under their action. Each pin can move between an extended position as in FIG. 2B and a retracted position. At each end of the cylinder there is provided an opening through which the members or pins 77$_2$ and 77$_3$ can easily enter and exit and thereby be placed in a fixed position along the axis 37 (as in FIG. 2C or 2D) and an unlocked position in which the retractable members or pins 77$_2$, 77$_3$ are at least partly engaged in the cylinder and in which the module can be removed from the axis.

The members 77$_2$ and 77$_3$ cooperate with corresponding members (for example holes) on the remainder of the machine.

In another example, it is the remainder of the machine which may comprise one or more members or pins 77$_2$, 77$_3$ (each cooperating with a spring), the module 30 being equipped with corresponding holes to cooperate with said members or pins. The module can thus be mounted and disassembled from the hydraulic circuit of the printer.

Means 77, 77$_1$-77$_3$ can also be applied to at least one of the other module(s) 10, 50 described in connection with FIGS. 1A-1C, 3A-3D or to the parts of the circuit or the printer with which said module(s) cooperate. One such member is schematically represented on FIGS. 1A-1C, resp.3E, positioned along a side of the housing 22, resp.52, or of its cover. Thus, the module is able to pivot or is rotatable around axis 17, resp.67, and can be locked in a fixed position along the axis 17, resp.67, and easily removed from said position.

Figure 3A:
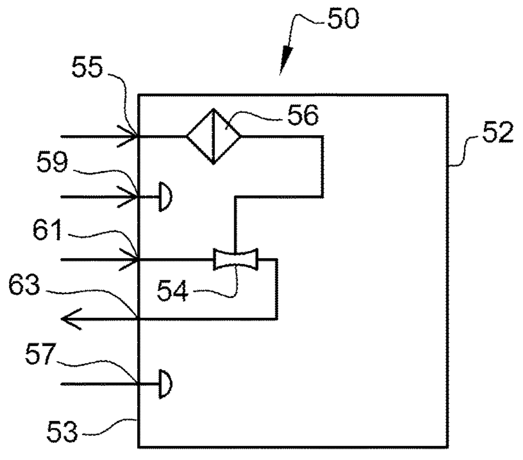
FIGS. 3A and 3B are schematic representations of a recovery (or vacuum) module which can be used in embodiments of the invention.
Figure 3B:
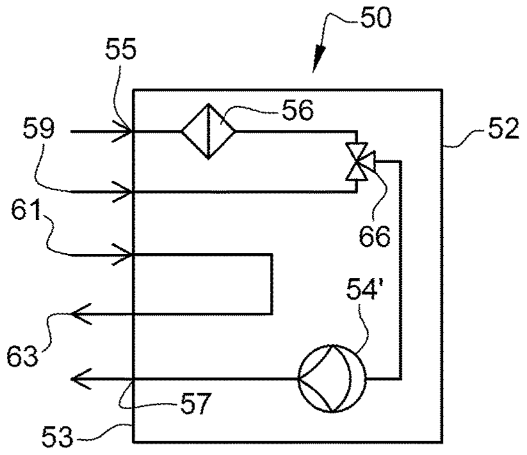
Figure 3C:
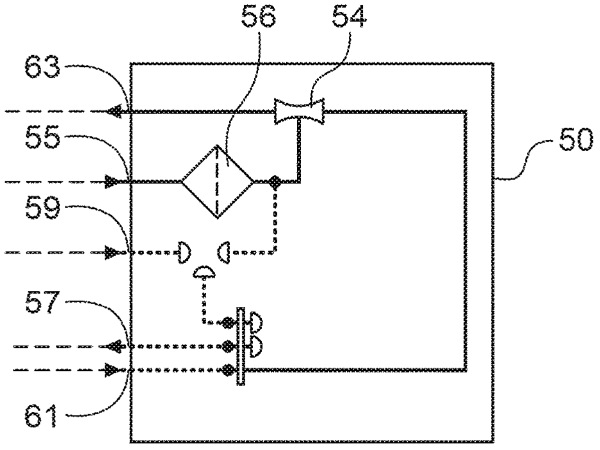
FIGS. 3C and 3D are variants of the embodiments of FIGS. 3A and 3B.
Figure 3D:
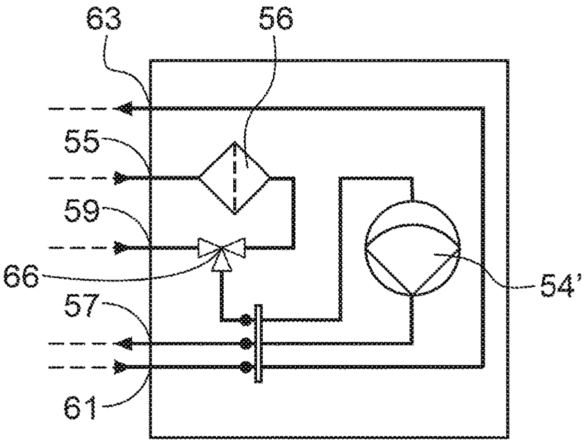

2 different examples of a recovery module 50 are illustrated on FIGS. 3A and 3B and variants thereof are illustrated on FIGS. 3C and 3D.

In an example, module 50 comprises a housing 52, possibly including a cover 53; said module comprises one or more fluid inlet(s) 55, 59, 61, and one or more fluid outlet(s) 57, 63; inside the housing, a recovery device, for example a venturi 54 (FIGS. 3A, 3C) or a diaphragm pump 54' (FIG. 3B, 3D), is to recover from the printing head ink not used for printing, the recovery device outlet being connected to one of the fluid outlets 57, 63; a filter 56 can be connected between the fluid inlet 55 and the recovery device in order to filter said ink recovered from the printing head; as illustrated on these figures:

- in the examples of FIGS. 3A and 3C, fluid inlet 55 is for ink returning from the print head and fluid inlet 61 is for solvent or air; this embodiment is preferred if the ink does not generate foam; on these two figures, the outlet 57 and the inlet 59 are not used and can be dispensed with;
- in the examples of FIGS. 3B and 3D, at least one 3-way valve 66 can also be connected between the filter 56 and the pump 54' in order to select a fluid from inlet 55 (usually ink returning from the print head) or inlet 59 (usually solvent or air); this embodiment is preferred if the ink generates foam; on these two figures, the inlet 61, the outlet 63 and the venturi are not used and can be dispensed with.

FIG. 3C, resp.3D, are variants of the examples of FIG. 3A, resp.3B, showing the same elements as on FIG. 3A, resp.3B, positioned differently inside the housing.

This module 50, like any other module in this application, can also be provided with an identifier, for example an electric identifier, or an RFID identifier or a magnetic identifier, to identify which embodiment is implemented, for example an embodiment according to FIG. 3A, comprising a venturi 54 as recovery device, or an embodiment according to FIG. 3A, comprising a pump 54' as recovery device.

For example, electrodes or contacts of an electric identifier (for example a resistor) can be apparent or accessible through a window of the housing of any module or single block assembly and contact corresponding electrical contacts of the ink circuit or on the interface when the module, for example module 50, is mounted in the circuit or on the interface. Said identifier can be for example a resistance with a first value of resistance for a module according to FIG. 3A and a second value of resistance, different from the first value, for a module according to FIG. 3B; a third value of resistance can correspond to another case, for example the absence of a module (an infinite value of resistance is detected if no module is present), or a module according to FIG. 3C or 3D.

Alternatively, any module or module type can have a RFID identifier or tag, storing identification information, the printer having means to read said information stored in said RFID identifier or tag.

Another identifier of any module or module type or single-block assembly in this application, can be of the magnetic type, for example based on an electrical switch, for example a "reed switch", operated by an applied magnetic field.

For example, a module may comprise several possible locations of one or more magnet(s), each location corresponding to a particular module or single-block and/or to at least one technical characteristic of said module or single-block. Several switches are located at different locations in the ink circuit. Depending on the location of the magnet(s) in the module, one or more of the switches is/are activated, which is detected by the printer or its controller. An identification of the module and/or of its technical characteristic (s) is thus obtained. Alternatively, a plurality of magnets can be located in the ink circuit, one or several of them interacting with one or more electrical switch(es) of the module, for example a "reed switch", depending on the location of the switch(es), the location of the switch(es) depending on one or more technical characteristics of the module.

In a particular embodiment, an identifier of a module comprises several (N) magnets disposed at several (N or more than N) possible locations in the module, each combination of magnets locations providing the identification of a particular module or single-block and/or of at least one technical characteristic of said module or single-block; for example, each combination of locations identifies a different type of pump or a different type of filter or a different type of recovery device. Each magnet of the combination interacts with means in the circuit, for example a switch, for example a "reed switch", which interaction is detected by the printer. This multiplies the possible identifications with respect to the identifications with only one magnet.

For example, if a module has 2 possible locations for a magnet:

2 identifications can be formed by one magnet in any of the 2 locations and no magnet in the other one; these identifications are designated by (1, 0) and (0,1), "1" representing the presence of a magnet and "0" the absence of a magnet;

one further identification is formed by two magnets, one in each of the 2 possible locations (1, 1).

In this case of 2 possible locations, 3 identifiers can thus be created, identifying 3 different modules or 3 variants of a same module.

Another example concerns the case of a module having 3 possible and different locations for one or more magnets:

3 identifications can be formed by one magnet in any of the 3 locations and no magnet in the other locations; these identifications are designated by (1, 0, 0), (0,1,0), (0,0,1), "1" representing the presence of a magnet and "0" the absence of a magnet;

other identifications are be formed by the 3 combinations of two magnets in the 3 possible locations (1, 1, 0), (0,1,1), (1,0,1) and by the 3 magnets in the 3 possible locations (1, 1, 1).

In this case of 3 possible locations, 7 identifiers can thus be created, identifying 7 different modules or 7 variants of a same module.

Of course, more identifications are possible with n>3.

Each magnet can interact with mans in the circuit, for example a switch, for example a "reed switch", disposed at a particular location in the circuit or in the interface to interact with a magnet disposed at a specific location in the module. For example, for 3 locations of 3 different magnets in the module, 3 switches are provided in the circuit, each one being able to interact with one magnet when it is in one specific position in the module. Any module and the ink circuit, or the corresponding interface of the module in the circuit, can be provided with the means to implement at least one of the above-mentioned identifiers. For example, the characteristics of the main filter 40 of the filter module (see FIGS. 2A-2B) can be identified with such an identifier. Or the characteristics of the pump 12 of the pump module (see FIGS. 1A-1C) can be identified with such an identifier.

The ink circuit has a receiving portion or zone or interface to receive the recovery module and connect it to the hydraulic circuit of the printer. The recovery module can be mounted in or on the ink circuit or on said receiving portion or zone or interface; it can be disassembled from said circuit or from said receiving portion or zone or interface of the ink circuit. For example, one or more screw(s), or nut(s), or bolt(s), or clip(s), or clamp(s) or hook(s) or any other securing means can be used to mount and disassemble and remove said module (see the examples of FIGS. 3E and 3F).

Said receiving portion or zone or interface has at least two fluid outlets which correspond to the fluid inlets 55 and 61 (FIG. 3A) or 55 and 59 (FIG. 3B) and at least one fluid inlet which corresponds to the fluid outlet 63 (FIG. 3A) or 57 (FIG. 3B) of said third single-block assembly, so that fluid can flow from said interface outlets into said third single-block assembly and then out of said third single-block assembly to said interface inlets.

Preferably, said receiving portion or zone or interface has at least three fluid outlets which correspond to the fluid inlets 55, 59 (FIG. 3A) and 61 (FIG. 3B) and at least two fluid inlets which corresponds to the fluid outlets 63 (FIG. 3A) and 57 (FIG. 3B) of said third single-block assembly; thus, a same receiving portion or zone or interface can connect different types of recovery modules.

An example of said receiving interface is described below.

Any of the embodiments of this module 50 can be provided with one or more means 77 as described above in connection with FIGS. 2C-2D. Such means are represented on FIG. 3E, positioned along a side of the housing 52 or of its cover 53. Conversely, it is the remainder of the machine which may comprise one or more means 77, the module 50 being equipped with corresponding means (for example holes) to cooperate with said means 77. In both cases the module 50 can be mounted along an axis (axis 67 on FIGS.

3E) and dismounted and removed from said axis. It is able to pivot or rotate around said axis 67 and can be locked and unlocked easily.

Figure 3E:
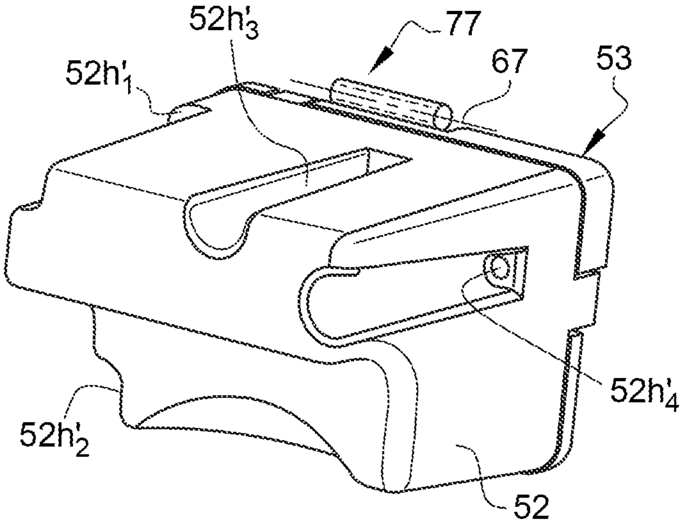
FIGS. 3E and 3F illustrate an example of a housing of a recovery (or vacuum) module which can be used in the invention.
Figure 3F:
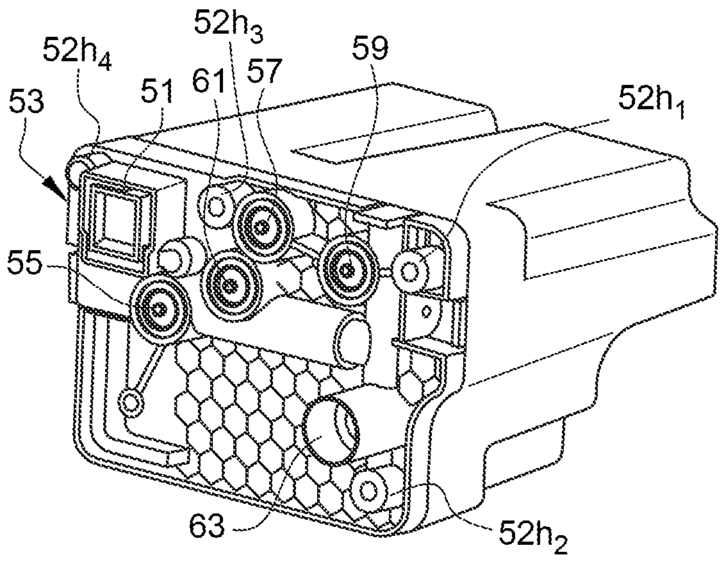

FIGS. 3E and 3F show an example of a vacuum or recovery module 50 which can be used in a method according to the invention. A cover 53 contains all fluid inlets/outlets.

Electrical contacts 51 of an electric identifier can be seen through an opening in cover 53; as explained above, they can be contacted by corresponding contacts of the circuit for identification of the embodiment of the module, the controller of the printer measuring the value of the resistance value through said contacts. In a variant (not represented on the figures), as explained above, an identifier can comprise means, for example one or more electrical switch(es), for example one or more "reed switch(es)", located in the ink circuit and which can be operated by a magnetic field generated by one or more magnet(s) located in the module.

The ink circuit has a receiving portion or zone or interface to receive the vacuum or recovery module 50, which can be mounted in the ink circuit or disassembled from said receiving portion or zone or interface of the ink circuit, for example with one or more screw(s), or nut(s), or bolt(s), or clip(s), or clamp(s) or hook(s) or any other securing means. Holes $52h_1$, $52h_2$, $52h_3$, $52h_4$, $52h'_1$, $52h'_2$, $52h'_3$, $52h'_4$ are shown on FIGS. 3E and 3F to accommodate screws.

As explained above, each of the modules 10, 30, 50 is maintained in the circuit by appropriate securing means so that each module can be mounted on the corresponding receiving zone or portion or interface of the circuit and disassembled or removed from said zone or portion or interface. This possibility to mount or disassemble any of the modules provides an ink-jet printer with a modular feature: the ink-jet printer can be adapted with different pump modules, and/or different filter module(s), and/or different recovery module(s), for example when manufacturing or building it and/or during use of the printer. For example, a recovery module like the one illustrated on FIG. 3A (resp. 3C) can be replaced by a recovery module according to the example of FIG. 3B (resp. 3D); more generally, any pump module, resp. filter or recovery module can be replaced by a pump module, resp. filter or recovery module, having different technical characteristics and possibly different inlet (s) and/or outlet(s).

As explained above, this can be achieved by at least one interface portion(s) or zone(s) or surface(s) which has all fluid inlet(s)/outlet(s) to make it compatible with different modules. Furthermore, one or more of said modules can comprise means 77 to position it along an axis of rotation and to rotate it around said axis. Such means can be combined with the above-described securing means: after the module is fixed with respect to the rotation axis, it is rotated and brought into contact with the corresponding receiving portion or zone or interface of the hydraulic circuit of the printer. In this position it can be locked with the corresponding securing means and used in combination with the hydraulic circuit. When the module must be removed, for example for being changed or repaired or cleaned, it is unlocked, rotated around the axis and then removed from said axis and from the printer.

Figure 4A:
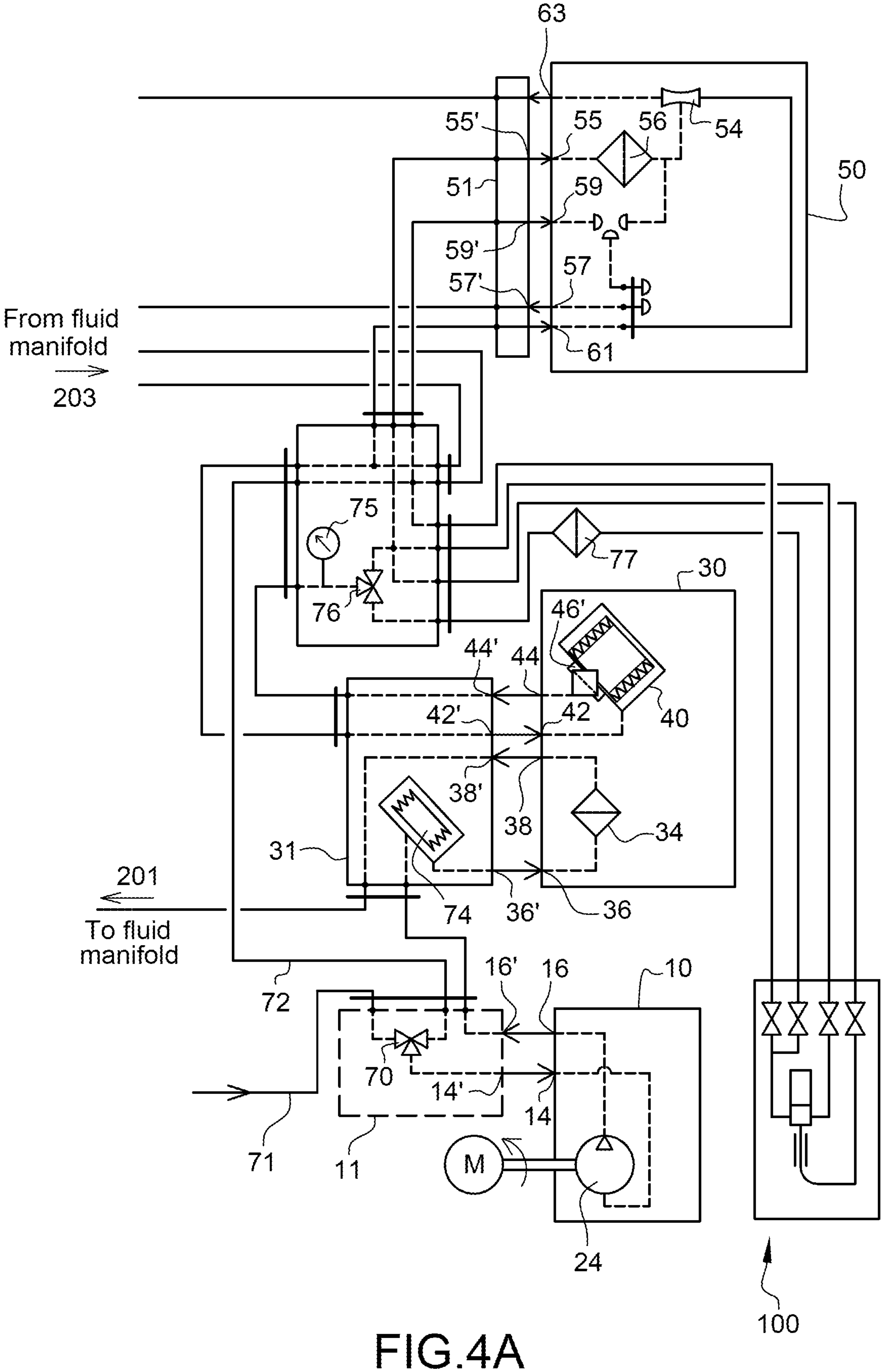
FIGS. 4A and 4B show different sets of a pump module, a filter module and a recovery (or vacuum) module which can be used in an embodiment of the invention and their fluid interfaces with a fluid circuit and the fluid connections to a print head.

FIG. 4A shows a set of a pump module 10, a filter module 30 and a recovery module 50 as disclosed above and their fluid interfaces with a fluid circuit and their fluid connections to a print head.

As can be understood from this figure, each module can be removed from the circuit independently from the other modules and can be mounted back (for example after a cleaning step) or replaced with a similar or identical module. For example the a recovery module according to FIG. 3A or 3C can be replaced by a recovery module according to FIG. 3B or 3D, in particular if a different ink is used in the printer. In another example any of the modules is replaced by a technically updated module, with more advanced technical functions.

In particular, a 3-way valve 70 can be connected to the inlet 14 of the ink pressure pump module 10. Depending on the operation stage of the printer, the fluid to be introduced into the module 10 is selected, with help of the valve 70, among a first fluid (ink supplied though a first duct 71) and a second fluid (air and/or solvent supplied though a second duct 72). The first fluid is thus pumped by pump 24, for example when the printer is printing, and is then sent to the print head through the fluid circuit, and in particular through the filter module 30. The second fluid is pumped by pump 24, for example when the circuit is being cleaned. An example of cleaning process implementing air (or gas) and solvent, is given below.

A damper 74 can be connected on the fluid path to the inlet 36 of the filter module 30 (between fluid outlet 16 of module 10 and fluid inlet 36 of module 30), in order to damp the pressures variations or oscillations of the ink before sending it to the print head, such pressures variations or oscillations being generated by the pump and degrading the print quality. The fluid then flows through filter 34 and is then sent to the print head through part of the fluid circuit (for example through a fluid manifold as illustrated on FIGS. 4A and 4B by arrows), and in particular through the filter 40.

A 3-way valve 76 can be connected to the outlet 44 of the filter module 30. Depending on the operation stage of the printer, the fluid flowing out of the filter module 30 can be sent, through the valve 76, either to the print head 100 (possibly through an additional filter 77) or to the main reservoir of the circuit (through the recovery module 50). A sensor 75 can be implemented to measure the pressure and/or the temperature of the fluid flowing out of the filter module 30.

In the illustrated example the fluid flowing out of the filter module 30 through outlet 44 and sent back to the main reservoir of the circuit ink circuit first flows through the recovery module 50, in particular through inlet 55, filter 56, recovery device 54 and outlet 57.

Part of the fluid sent to filter module 30 can also be sent back to the part of the fluidic circuit, for example to a fluid manifold, as illustrated on FIG. 4A (see arrow 201); the fluid returning from said part of the circuit (see arrow 203), for example from said fluid manifold, separates between a 1st flow sent to the filter module 30 and a $2^{nd}$ flow sent to the recovery module 50.

Figure 4B:
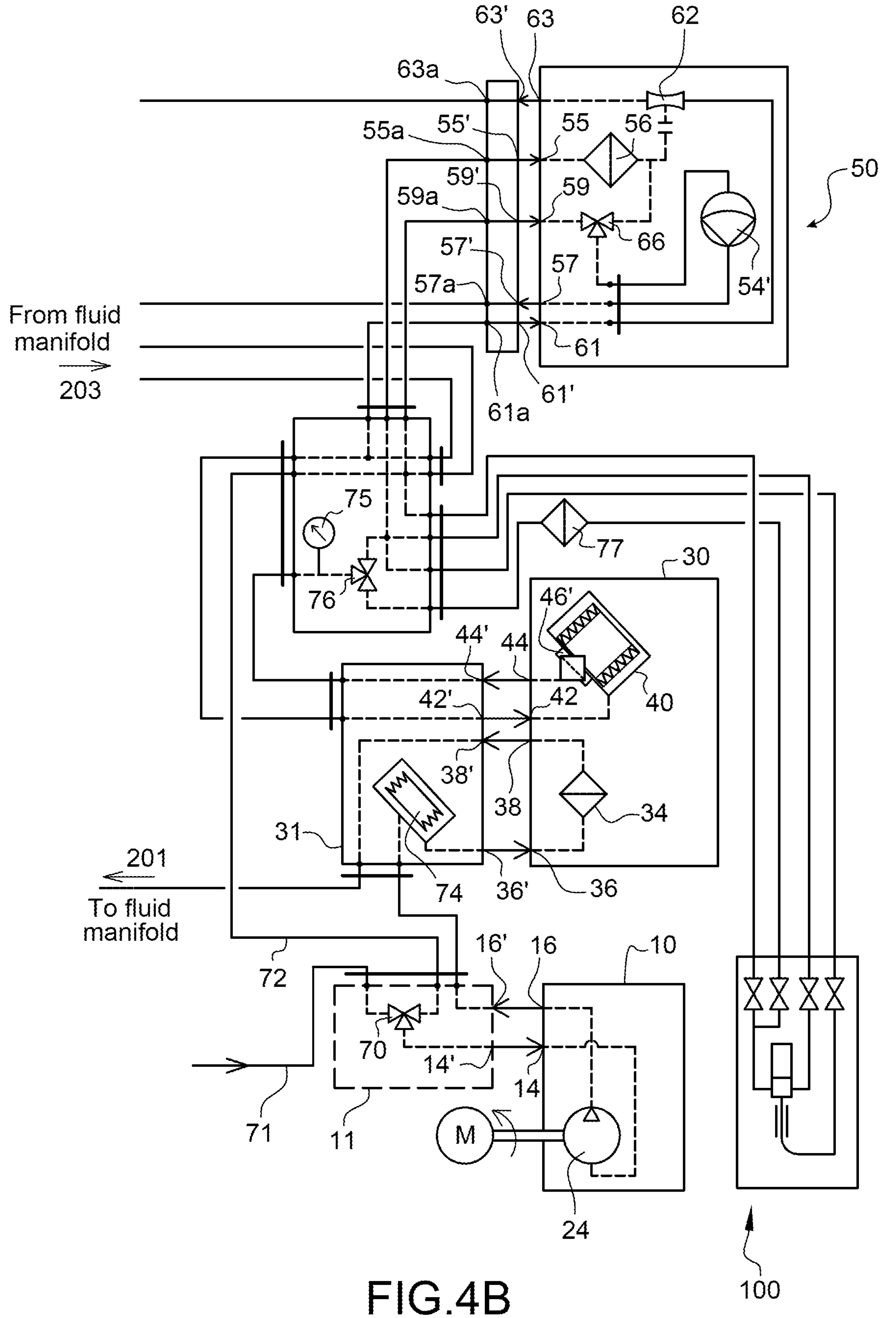

FIG. 4B shows another set of a pump module 10, a filter module 30 and a recovery module 50 as disclosed above, the vacuum module being of the type disclosed above in connection with FIG. 3D.

The modules 10 and 30 are identical to the modules 10 and 30 of FIG. 4A and the above description applies to them as well as to the other components bearing identical reference numbers.

Module 50 implements a diaphragm pump 54' and comprises a further fluid inlet and a further fluid outlet with respect to FIG. 4A. Pump 54' pumps either a first fluid through fluid inlet 55 (and through filter 56) or a second fluid through second fluid inlet 59.

The fluid flowing out of the filter module 30 and sent back to the main reservoir of the circuit ink circuit first flows through the recovery module 50, in particular through inlet 55, filter 56 and diaphragm pump 54'.

A 3-way valve 66 can be connected to the outlet of filter 56. Depending on the operation stage of the printer, the fluid pumped by pump 54' can be selected, with help of the valve 66, among the first fluid and the second fluid. It then flows through outlet 57 and to the main reservoir.

Just like for the embodiment of FIG. 4A, part of the fluid sent to filter module 30 can also be sent back to the part of the fluidic circuit, for example to a manifold, as illustrated on FIG. 4B; the fluid returning from said part of the circuit, for example from said manifold, separates between a 1st flow sent to the filter module 30 and a $2^{nd}$ flow sent to the recovery device 54'.

On both FIGS. 4A and 4B the hydraulic circuit further comprises fluidic interfaces 11, 31, 51. Examples of such interfaces are shown on FIGS. 4C-4E. Each forms a fluidic interface between one of the modules 10, 30, 50 and the rest or the other part(s) of the circuit. Each of said interfaces has fluidic inlet(s)/outlet(s) 14', 16', 36', 38', 44', 57', 63', 61', 59, 55' corresponding to the outlet/inlet(s) of modules 10, 30, 50. It also has inlet(s)/outlet(s) 14*a*, 16*a*, 38*a*, 57*a*, 63*a* corresponding to the outlet/inlet(s) of the rest or the other part(s) of the circuit. Each of said interfaces comprises the appropriate ducts to connect its fluid inlet(s) and outlet(s).

Figure 4C:
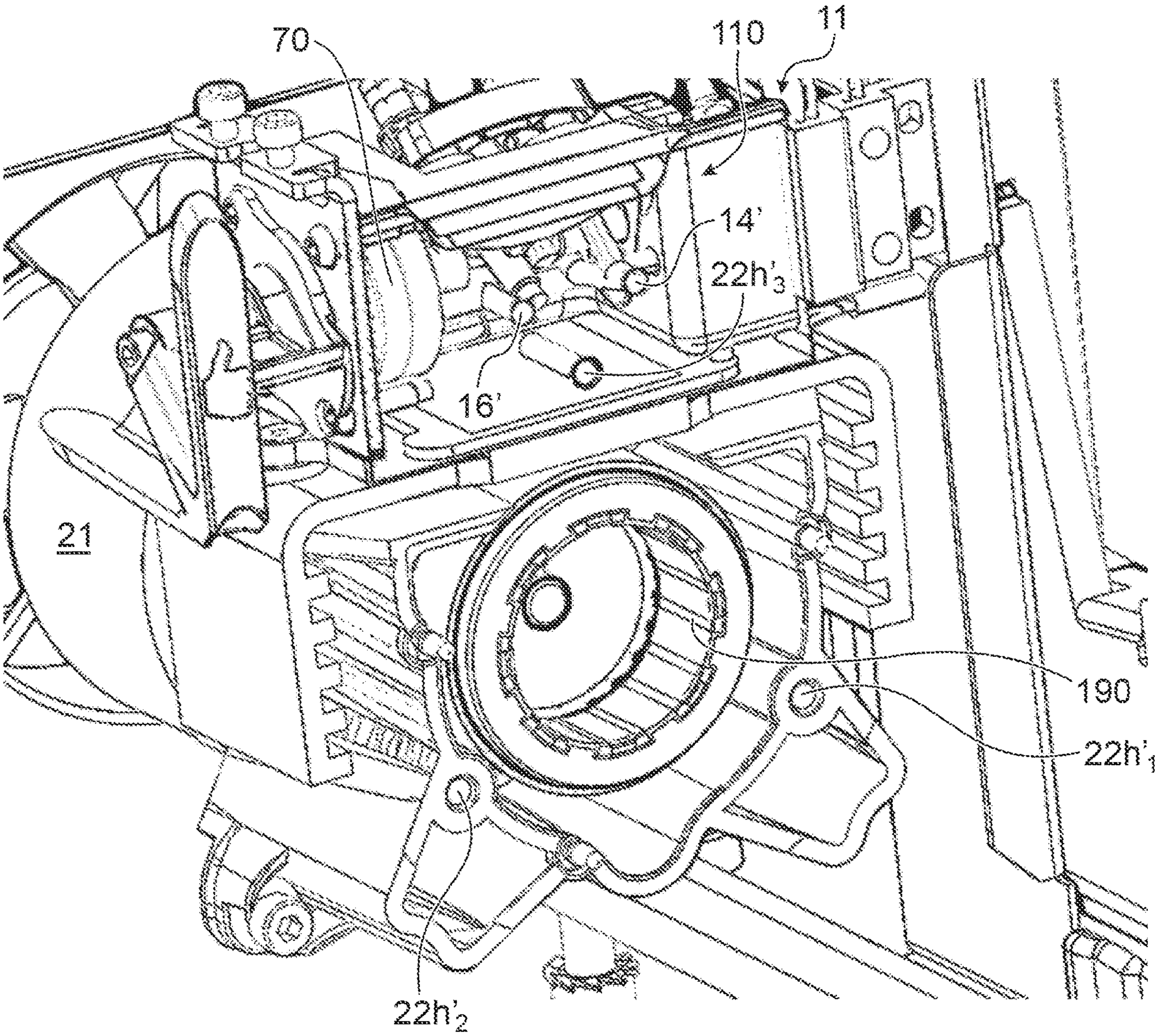
FIGS. 4C-4F show examples of interfaces for connecting removable or detachable modules to an ink circuit of an ink jet printer which can be used in embodiments of the invention.

FIG. 4C is an example of interface 11 which comprises a substantially flat surface 110 and inlet(s)/outlet(s) 14', 16' corresponding to the outlet/inlet(s) of module 10. The other side of interface 11, not visible on this figure, has inlet(s)/outlet(s) corresponding to the outlet/inlet(s) of the part of the circuit connected to said module 10 (see FIG. 4A or 4B).

This figure also shows, under the interface 11, the part of a magnetic pump which remains outside housing 22 (see FIG. 1A), including the outer magnetic ring 190 and the motor 21; the part 12*m* of the shell (see above and FIG. 1C) comes into the cylindrical portion surrounded by the outer magnetic ring 190.

The interface 11 can comprise means to interact with an identifier of the pump module. For example, the interface 11 comprises electrical contacts to contact an electric identifier of the pump module 10, as already explained above. In a variant (not represented on the figures), as explained above, an identifier can comprise means, for example one or more electrical switch(es), for example one or more "reed switch (es)", located in the ink circuit and which can be operated by a magnetic field generated by one or more magnet(s) located in the module.

The holes $22h'_1$, $22h'_2$, $22h'_3$ correspond to the holes $22h_1$, $22h_2$, $22h_3$ of FIG. 1C.

Figure 4D:
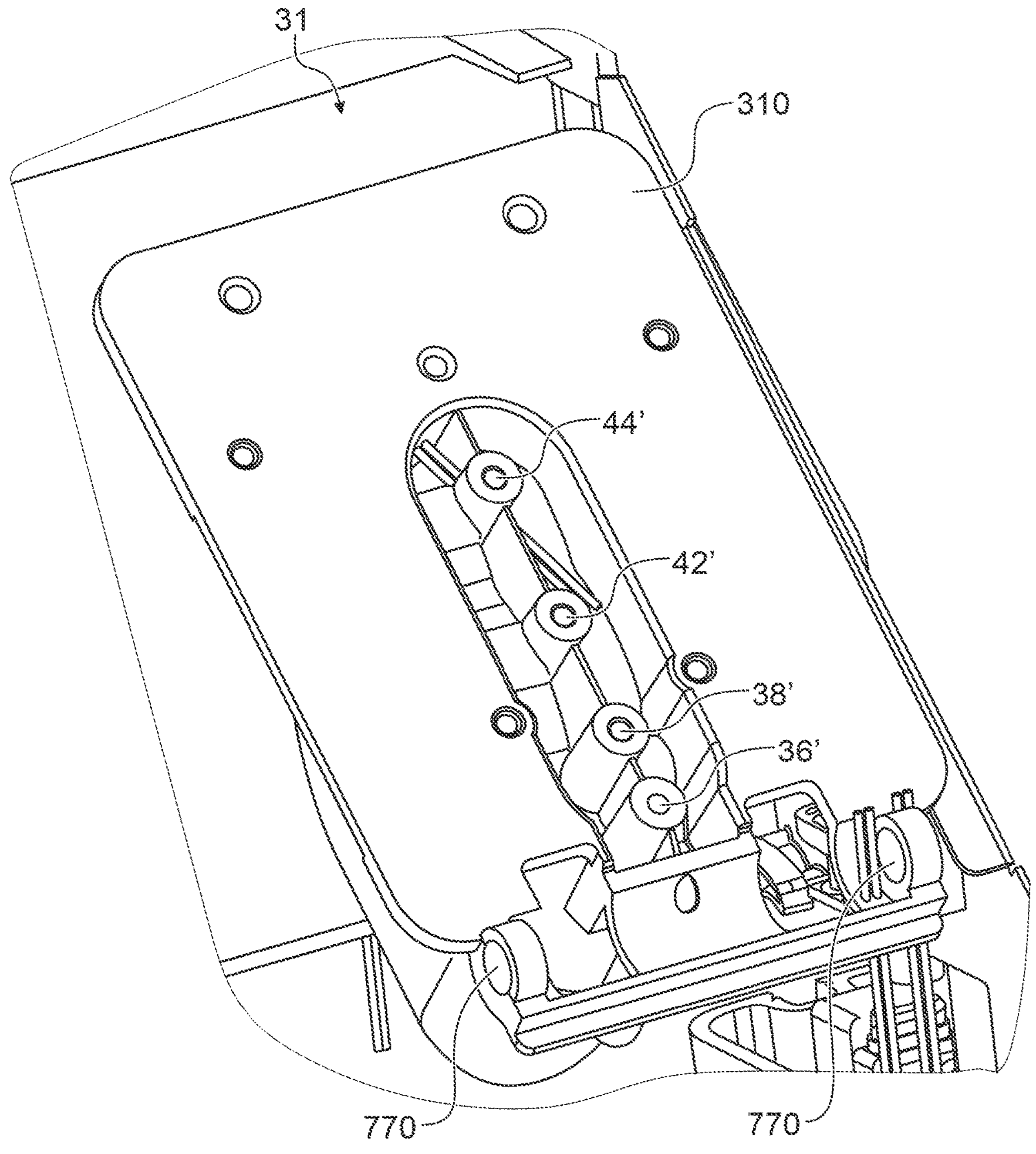

FIG. 4D is an example of interface 31 which comprises a substantially flat surface 310 and inlet(s)/outlet(s) 36', 38', 42', 44' corresponding to the outlet/inlet(s) of module 30. The other side of interface 31, not visible on this figure, has inlet(s)/outlet(s) corresponding to the outlet/inlet(s) of the part of the circuit connected to said module 31 (see FIG. 4A or 4B).

This figure also shows holes 770, 771 which cooperate with retractable members or pins $77_2$, $77_3$ of means 77 (FIG. 2B) as explained above.

The interface 31 can comprise means to interact with an identifier of the filter module. For example, the interface 31 comprises electrical contacts to contact an electric identifier of the filter module 10, or a plurality of electric switches, like "reed" switches, to cooperate with a magnet which is located in the filter module, at different locations depending on the characteristics of the filter module.

Figure 4E:
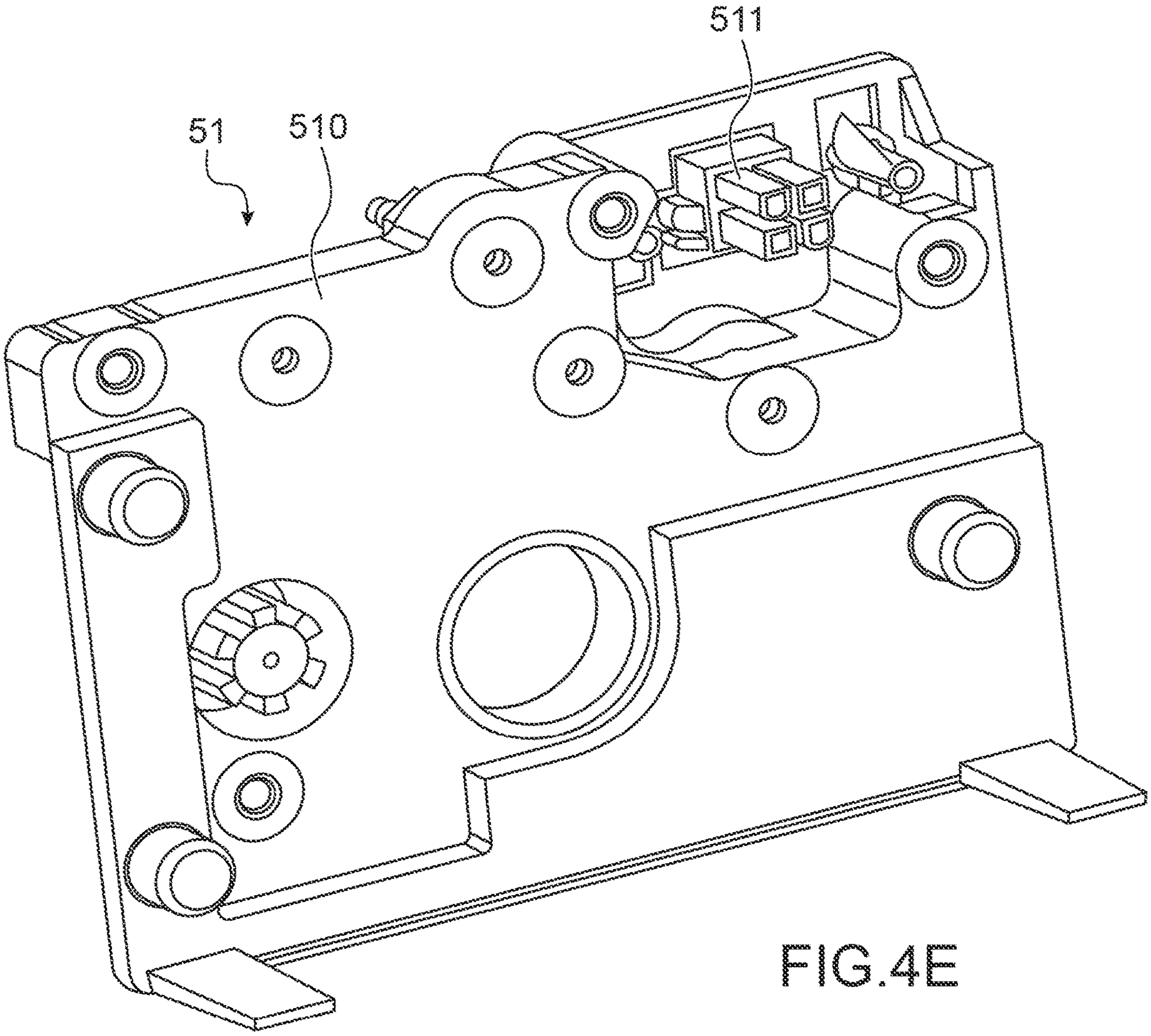

FIG. 4E is an example of interface 51 which comprises a substantially flat surface 510 and inlet(s)/outlet(s) 59', 61', 63' corresponding to the outlet/inlet(s) of module 50. The other side of interface 51, not visible on this figure, has inlet(s)/outlet(s) corresponding to the outlet/inlet(s) of the part of the circuit connected to said module 51 (see FIG. 4A or 4B).

Each of said interfaces comprises the appropriate duct(s) to connect its fluid inlet(s) and outlet(s). In particular, when several possible alternative modules can be connected on the same interface, said interface comprises the ducts (fluid inlets and/or outlets) and/or electrical contacts to be compatible with the several modules.

For example, interface 51 has several inlets/outlets in order to be able to connect either the recovery module of FIG. 3A or the recovery module of FIG. 3B. The module of FIG. 3A has inlets 55, 59 which are not used, the fluid entering this module through either inlet 55 or inlet 61 and leaving the module through outlet 63; the module of FIG. 3B has 3 inlets 55, 59, 61 which are all used, the fluid entering this module by any of them, and leaving the module by outlet 57 or 63.

The same applies to the other interfaces which are for connecting any of the other single block assemblies: thus, any interface preferably contains all necessary inlets/outlets and/or electrical contact(s) and/or magnetic means, so that any version or technically updated first, resp. second, resp. third. single block assembly can be connected to interface 11, resp.31, resp.51.

FIG. 4E also shows electric connections 511 to connect the electrical contacts 51 of an electric identifier (see FIG. 3E).

In a variant (not represented on the figures), as explained above, an identifier can comprise means, for example one or more electrical switch(es), for example one or more "reed switch(es)", located in the ink circuit, for example in the interface, and which can be operated by a magnetic field generated by one or more magnet(s) located in the module.

Figure 4F:
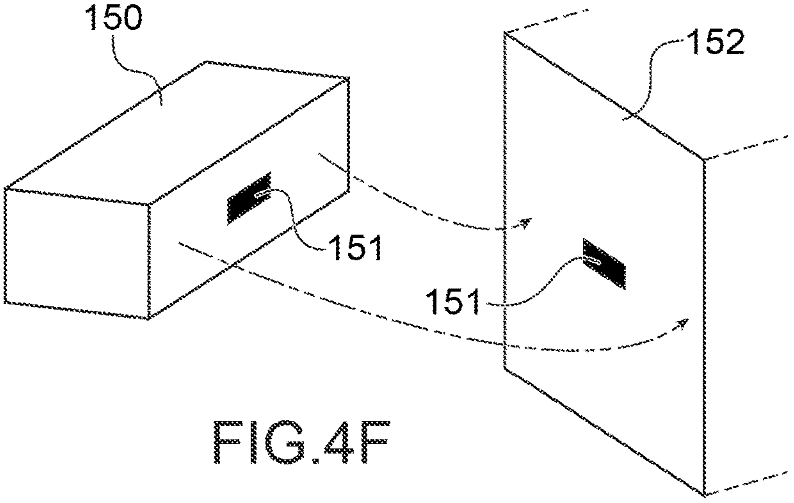

One or more of the modules, in particular of the above-described modules, and the part of the circuit or the corresponding interface to which it must be connected can be provided with magnetic means to help positioning the module with respect to the ink circuit or to the corresponding interface. FIG. 4F shows a module 150, which can be for example any of the above-described first, second or third modules and the corresponding interface 152 to which it must be connected. Each of the module and the interface has a magnet 151, 153 positioned and oriented such that the two magnets attract each other when the module is correctly positioned with respect to the interface. Alternatively:

- module 150 has a magnet 151 and the interface 152 has a piece of material, for example a ferromagnetic material, having magnetic properties;
- the interface 152 has a magnet 153 and module 150 has a piece of material, for example a ferromagnetic material, having magnetic properties; this solution is preferred because a magnet in the module can perturb one or more sensor(s) implement in the circuit to measure for example pressure.

Module 150 can be for example any of the above-described modules. Other components or parts can be mounted on the circuit by being guided by magnetic means as described above.

The above-mentioned and described modules can be implemented in a fluid circuit as shown on FIG. 5A. A cleaning process of this circuit will be explained below.

As illustrated on FIG. 5A, this circuit comprises a main reservoir 80, an ink cartridge 82 and a solvent cartridge 84 (both cartridges can be removed from the circuit) and hydraulic module 90 (or manifold) and a number of ducts to connect the cartridges 82, 84, the reservoir 80 and the different modules 10, 30, 50.

An example of a cartridge 82, 84 is shown in FIG. 10.

It comprises a portion 120 (this portion is the most rigid, but can however be deformed somewhat when the cartridge is empty) and a semi-rigid, or flexible, portion 140. The rigid portion 120 is provided with a rigid nipple (or mouth, also called "nose" or "nozzle") 160 that allows for a hydraulic connection to the ink circuit. Initially, the nipple is closed by a capsule of a rubber-type material, for example of EPDM, or other (chemically compatible with the fluids in question), being hermetically crimped or sealed. Upon setting up the cartridge, a hollow needle, linked to the ink circuit, hits the capsules and establishes the hydraulic circuit between the cartridge and the ink circuit. The elastic material of the capsule is chosen to ensure the sealing of the needle-capsule junction.

Another example of cartridge has a storage chamber and a distal end portion which has a cylindrical shape and is closed by a lid.

Figure 8A:
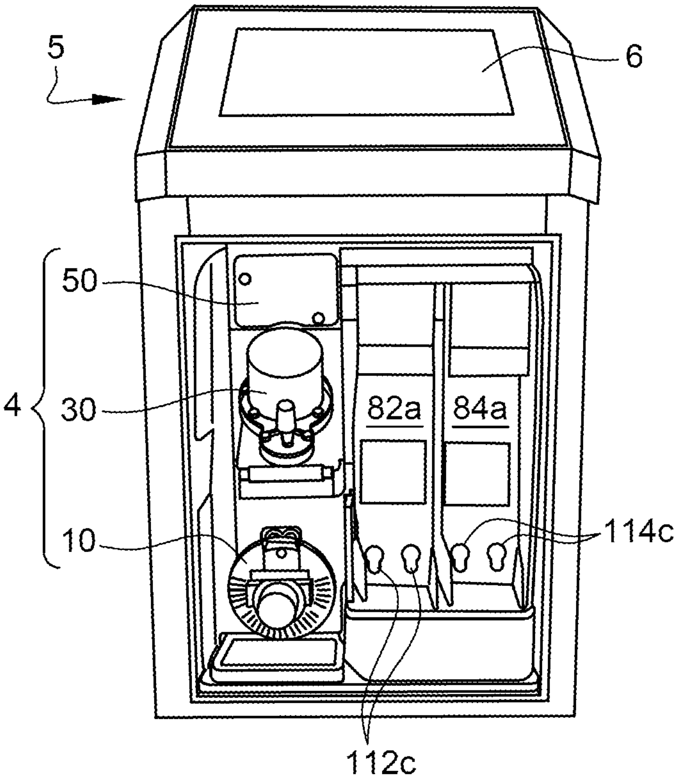
FIG. 8A shows a front view of a cabinet of an ink-jet printer, illustrating a pump module, a filter module and a vacuum module which can be used in an embodiment of the invention or to which the invention may apply.

Examples of cartridge holders 82*a*, 84*a* are shown on FIG. 8A. Each comprises means 112*c*, 114*c* of fluidic connection, to which the nipple 160 of a cartridge is connected when the latter is inserted into the cartridge holder; these means 112*c*, 114*c* comprise for example a cannula that fits into the capsule that closes the nipple 160, and are connected to the circuit for supplying the printer, for example, with solvent or ink; alternatively each of these means 112*c*, 114*c* comprises a cylindrical portion that fits into the cylindrical shape of the distal end portion of the cartridge. This cannula or the cylinder pierces or penetrates into the nipple 160 or the lid of the cartridge in order to put the inside of the cartridge and the supply circuit into fluidic communication. The hydraulic connection nipple or the distal end portion of each cartridge communicates with the ink (or solvent) circuit via the means 112*c*, 114*c*.

The hydraulic module 90 preferably has an ink portion and a solvent portion, the ink portion comprising ink pump 92 for pumping the ink from ink cartridge 82 and the solvent portion comprising pump 94 for pumping the solvent from solvent cartridge 84. It can also comprise a number of 3-way valves $\mathbf{93}_1$, $\mathbf{93}_2$, $\mathbf{93}_3$, 99 to send the appropriate fluid to the appropriate module 10, 30, 50 and/or to the reservoir 80. Ducts 96-98 connect the ink portion and the solvent portion of the hydraulic module 90 with the reservoir 80; ducts 102-104 connect the ink portion and the solvent portion of the hydraulic module 90 with the different modules 10-50 as shown on FIG. 5.

Each of the modules 10, 30, 50 is maintained in the circuit by appropriate fastening or securing means, already described above, so that each module can be mounted on the circuit and disassembled or removed from said circuit.

The main reservoir 80 can be of the type comprising two compartments as disclosed in EP 3466697, the upper compartment $\mathbf{80}_1$ for storing ink and the lower compartment $\mathbf{80}_2$ for storing solvent:

- the upper part $\mathbf{80}_1$ can be supplied with ink from cartridge 82 through one or more of said valves $\mathbf{93}_1$, $\mathbf{93}_2$, $\mathbf{93}_3$, and one or more of said ducts 96; Ink can be pumped from this upper part by the pump of module 10 through one or more ducts 110;
- the lower part $\mathbf{80}_2$ can be supplied with solvent from cartridge 84 through one or more of said valves 99 and one or more of said ducts 97; solvent can be pumped from this lower part by the pump 94 through one or more ducts 98.

A flushing or cleaning process according to the invention can be implemented to clean the above-described circuit, in particular the 3 different modules 10, 30, 50, or to clean only part of it, for example only one of the modules 10, 30, 50, in particular if only one of the modules 10, 30, 50 is to be unplugged or detached from the circuit and repaired or replaced. If such a cleaning process is not performed, ink flows out of any of the modules 10, 30, 50 when it is unplugged or disassembled from the printer, which results in a loss of ink and solvent and, of course, in dropping on the rest or the other part(s) of the system and out of the printer and of the module.

In an embodiment both solvent and ink cartridges 84, 82 are first unplugged from the circuit and ink cartridge 82 is replaced with a recovery cartridge for recovering dirty or cleaning fluid from the circuit. The solvent cartridge 84 being removed, gas, for example air (at atmospheric pressure) can be pumped from means 114*c* of fluidic connection by activating the pump(s) 94, 24 and the valves of the circuit, in particular valves $\mathbf{93}_1$, $\mathbf{93}_2$, $\mathbf{93}_3$, as if the solvent cartridge was connected to the ink circuit and solvent had to be pumped.

Pump 94 is started, thus pumping air as explained above throughout the whole circuit or through part of it, and in particular through one or more of the modules 10, 30, 50. Ink present in the circuit is thus sent back to the ink tank 80, through appropriate position of each of the valves 99, $\mathbf{93}_3$, 70, 76.

In the following steps, ink present in the circuit is sent to the recovery cartridge, through appropriate position of each of the valves 99, $\mathbf{93}_3$, 70, 76.

The valves 99 (FIG. 5A) or 339 (FIG. 7A, commented below) are then controlled so that alternative or simultaneous steps of cleaning one or more of the modules 10, 30, 50 with gas (for example air) and solvent (in this order or in the reversed order) are performed a number of times, for example between 3 and 10 times. Clean solvent can be pumped by pump 94 from the lower part $\mathbf{80}_2$ of tank 80 (or from tank 314 on FIG. 7A).

A solvent rinsing step can be performed to eliminate any residual ink which could remain in the circuit, or in part of it, for example in one or more of the 3 modules 10, 30, 50. In a preferred embodiment, a drying step can be performed after cleaning by circulating gas in all or part of the circuit, ensuring elimination of substantially all the residual solvent, for example at least 85% or 90% of the residual solvent, present in the circuit. Thus, one or more of the modules 10, 30, 50 can be disassembled from the circuit with reduced risks of ink or solvent spillage.

In the above-described process, solvent thus flows through the same path as the gas.

The above flushing or cleaning steps can be performed for only a part of the circuit, for example for only one of the modules 10, 30, 50. Only cleaning the part or the component of the circuit which must be removed from the circuit saves solvent.

After a flushing or cleaning process as described above has been performed, one or more of the cleaned modules 10, 30, 50 can be disassembled and removed from the printer, and repaired or replaced.

The above process can also be implemented if:

- none of the above removable modules is disassembled from the circuit;

or if the circuit does not contain any removable module or block and if all component, except the cartridges, and possibly one or more individual fluid components such as one or more valves, and/or one or more pumps, and/or one or more filters, are fixed with respect to the circuit.

In both cases:

keeping the circuit clean and possibly dry, even without disassembling any module or component or part, is also advantageous;

or individual fluid components such as one or more valves, and/or one or more pumps, and/or one or more filters, can be disassembled from the circuit with the same advantages as explained above for the removable modules.

Figure 6:
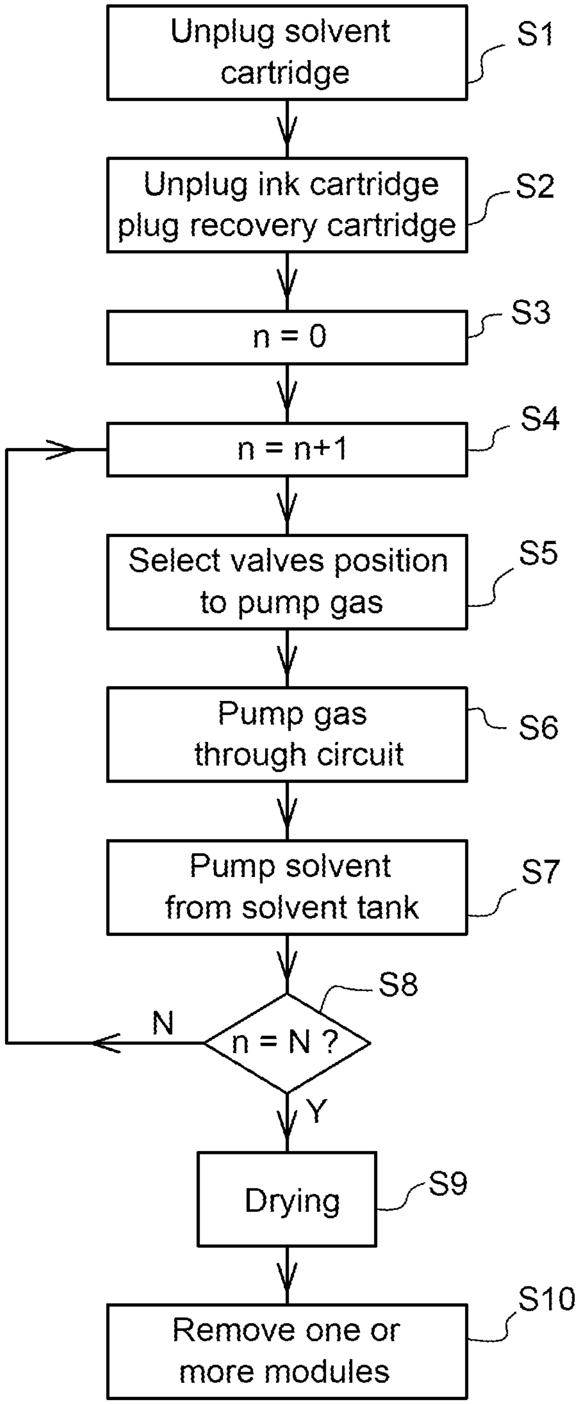
FIG. 6 shows steps of a flushing or cleaning method according to an embodiment of the invention, in order to clean a fluid circuit which can comprise one or more removable modules, for example a filter module, a pump module and a vacuum module.

FIG. 6 shows steps of an embodiment of a flushing or cleaning process according to the invention:

step S1: unplug solvent cartridge;

step S2: unplug ink cartridge and replace ink cartridge with cartridge for recovering dirty fluid;

step S3: set n=0;

step S4: increment n: n→n+1;

step S5: select valve(s) position(s) to pump gas;

step S6: pump gas, for example air through at least part of the circuit or throughout the whole circuit;

step S7: then pump solvent (for example from solvent tank or compartment $\mathbf{80}_2$) through part of the circuit or throughout the whole circuit;

step S8: compare n with N (for example N<10); if n<N, go back to step S4, increment n: n→n+1 and repeat steps S5-S7;

step S9: if n=N: possibly dry all or part of the circuit;

step S10: remove one or more modules 10, 30, 50 from circuit.

In a variant, the order of gas and solvent can be reversed and steps S5-S7 are replaced by following steps S'5-S'7:

step S'5: select valve(s) position(s) to pump solvent;

step S'6: pump solvent (for example from solvent tank or compartment $\mathbf{80}_2$) through at least part of the circuit or throughout the whole circuit;

step S'7: then pump gas, for example air, through at through least part of the circuit or throughout the whole circuit.

In an example, gas and solvent are alternatively pumped according to steps S5-S7 or S'5-S'7 through only one of the modules 10, 30, 50 because only one module, for example the pump module 10, must be disassembled from the circuit. More generally, gas and solvent can be alternatively pumped according to steps S5-S7 or S'5-S'7 through at least one component or part, for example a valve or a filter or a pump, because said component or part must be replaced. An alternative pumping can be performed by activating one or more valves.

In a preferred embodiment, an initial step of circulating gas in at least part of the circuit allows recovering ink which can be sent to the main tank (ref 80 on FIG. 5A).

The further steps of the flushing or cleaning process comprise circulating gas and solvent in at least part of the circuit, dirty fluid being recovered in the cartridge for recovering dirty fluid through adapted control of the valves of the circuit.

This creates a gas-solvent mixture, for example a circulation of alternating volumes 401 of gas and of volumes 402 of solvent in a duct 400 (FIG. 11A, or "slug flow"), each of said volumes being for example less than 1 $cm^3$, possibly forming a diphasic or biphasic mixture of said gas and said solvent (for example between 80% and 95% of solvent and 20% to 5% of gas) which is efficient to clean the circuit; alternatively, it can be a mixture of gas in solvent like for example on FIG. 11B (bubbles of gas 404 being in suspension in a solvent flow 406 or "emulsion").

In a variant of the process illustrated on FIG. 6, compressed gas is introduced into the circuit, in which case there is no need to pump it, the volume of gas introduced being for example controlled by a valve.

As indicated above, a drying step can be performed at the end of the cleaning process, for example by circulating gas in all or part of the circuit, for example compressed gas and/or heated gas. Gas can be heated by circulating it over heating means, for example one or more resistors, for example before being injected into the circuit. A drying step allows disassembling one or more of the modules 10, 30, 50 with a reduced risk of ink or solvent spillage.

The above process can also be implemented if:

none of the above removable modules is disassembled from the circuit;

or if the circuit does not contain any removable module or block (which applies in particular to the circuit of FIG. 7A, see below) and if all component, except the cartridges, and possibly one or more individual fluid components such as one or more valves, and/or one or more pumps, and/or one or more filters, are fixed with respect to the circuit.

In both cases:

keeping the circuit clean and possibly dry, even without disassembling any module or component or part, is also advantageous;

the process of FIG. 6, or one of its above-mentioned variants, is adapted so as not to include the final step S10 (but may include step S9);

individual fluid components such as one or more valves, and/or one or more pumps, and/or one or more filters, can possibly be disassembled from the circuit with the same advantages as explained above for the removable modules.

In another embodiment, a circuit may comprise removable cartridges but the process may not involve removing said cartridges, steps S1 and S2 not being performed (see example below).

In another embodiment, if a circuit does not comprise removable cartridges (see example below), steps S1 and S2 are also not performed.

Figure 7A:
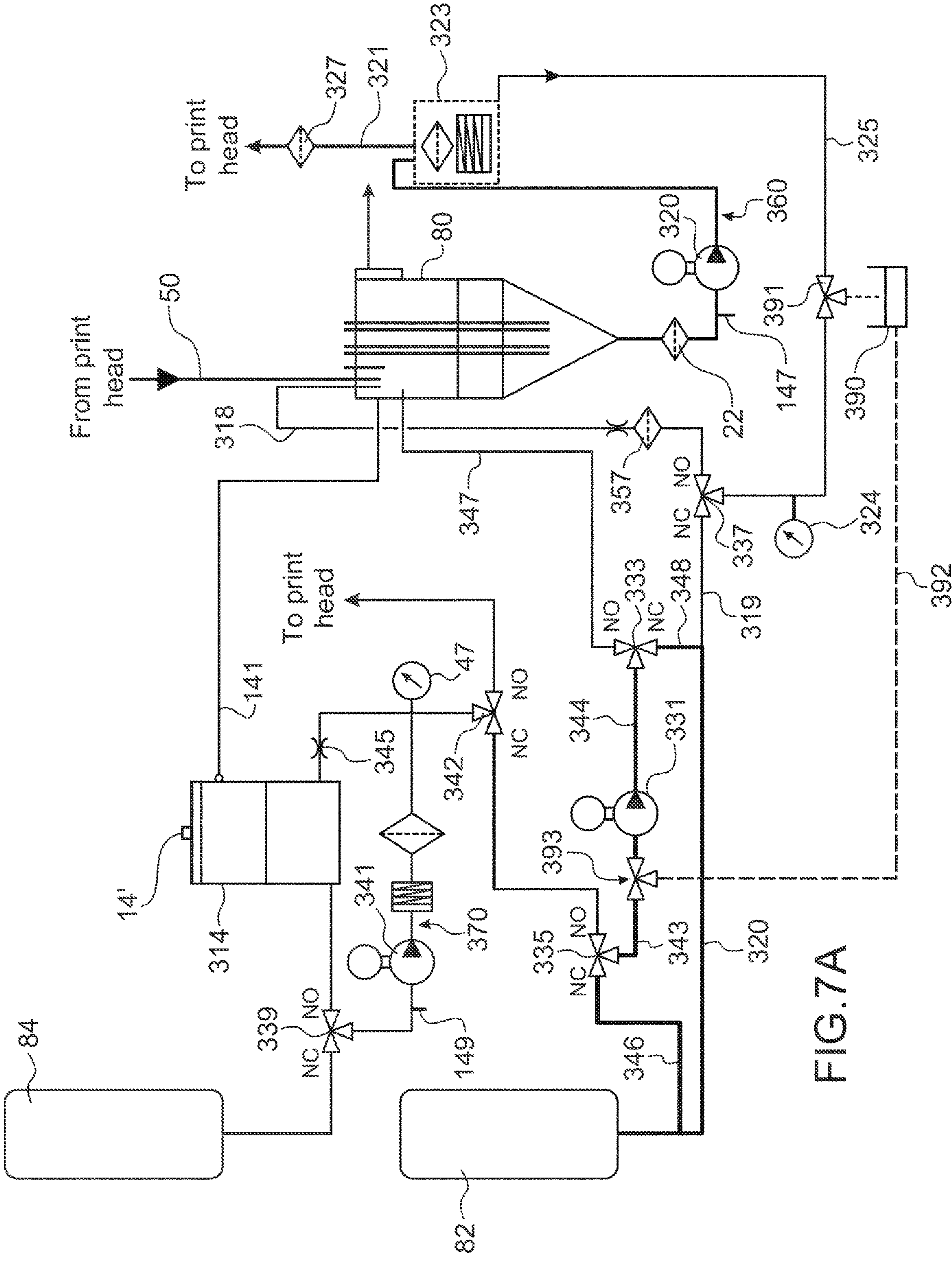
FIG. 7A shows another fluid circuit to illustrate another flushing or cleaning method according to the invention.

FIG. 7A shows another example of fluid circuit to which another flushing or cleaning process according to the invention can be applied. This circuit does not contain any removable module or block, except the cartridges and some fluidic components like one or more valve(s) and/or one or more pump(s) and/or one or more filter(s) or damper(s) which can possibly be disassembled or removed from the circuit.

This fluid circuit is described in detail in EP 3085541.

It comprises in particular:

an ink tank 80 from which ink can be pumped by a pump 320, the ink pumped by said pump flowing through a damper module 3123 and then through a filter before being sent to the print head; part of the ink can be returned to the ink tank 80 through duct 325, 3-way valve 337, and duct 318;

a solvent reservoir 314 to which solvent is supplied from a solvent cartridge 84 and a pump 341 and a restriction 345;

a pump 331 to pump ink from an ink cartridge 82 through a 3-way valve 335; ink is then sent to ink tank 80 through a 3-way valve 333; said pump can also ump solvent from reservoir 314 through 3-way valve 342.

A flushing or cleaning process as explained above, in particular in connection with FIG. 6 (but not step S10), or one of its above-mentioned variants, can be applied to the circuit of FIG. 7A.

In particular, cartridges 82 and 84 can be unplugged, cartridge 82 being replaced with a recovery cartridge.

3-way valve 339 can be controlled so that gas, for example air (at atmospheric pressure) and solvent can be alternatively pumped by pumps 341 and 331 and sent to at least part of the circuit, dirty solvent being recovered in the recovery cartridge by controlling 3-way valves 333 and 337 (the valves of the printing head, not illustrated on this figure, being closed, so that no solvent flows towards the printing head).

Thus a gas-solvent mixture is formed, for example a circulation of alternating volumes 401 of gas and of volumes 402 of solvent in a duct 400 (FIG. 11A, or "slug flow"), each of said volumes being for example less than 1 $cm^3$, possibly forming a diphasic or biphasic mixture of said gas and said solvent (for example between 80% and 95% of solvent and 20% to 5% of gas) which is efficient to clean the circuit; alternatively, it can be a mixture of gas in solvent like for example on FIG. 11B (bubbles of gas 404 being in suspension in a solvent flow 406 or "emulsion").

In a preferred embodiment, an initial step of circulating gas, for example air, in at least part of the circuit allows recovering ink which is sent to the main tank. The further steps of the cleaning process comprise circulating air and solvent in at least part of the circuit, dirty fluid being recovered in the recovery cartridge, through adapted control of the valves of the circuit.

As indicated above, a drying step can be performed at the end of the cleaning process, for example by circulating air in all or in part of the circuit, for example compressed air and/or heated air. Air can be heated by circulating it over heating means, for example one or more resistors, for example before being injected into the circuit. A drying step allows disassembling one or more of fluidic components like one or more valve(s) and/or one or more pump(s) and/or one or more filter(s) or damper(s) with reduced risk of ink or solvent spillage.

It has to be noted that some residual amount of solvent may remain in at least part of the circuit after cleaning and drying but this amount is minor (less than 15% or 10% of the initial volume, this value can even be significantly reduced with compressed air and/or heated air) and does not prevent from disassembling one or more of the above-mentioned fluidic components in good conditions, with a minimum risk of spillage or dropping.

Another cleaning process can be applied to the circuit of FIG. 7A, without removing cartridges 82, 84.

Air, or, more generally, a gas, can be introduced into the ink circuit at specific locations, for example:

- upstream of one or more pumps 320, 341 as indicated on FIG. 7A by reference numbers 147, 149;
- or downstream or at the outlet of one or more pumps as indicated on FIG. 7A by arrow 360, resp. 370, in particular if said gas is compressed, for example if it is provided by a compressor. In order to avoid any interference of the gas with the pump 320, resp. 341, a non-return valve can be mounted at the outlet of each of said pumps.

Gas can be introduced into the circuit at any of the above locations for example through a side duct laterally connected to the main ducts (or the main duct has a "T" shape). FIGS. 7B-7E, which are commented below, give examples of a tool for introducing gas directly into the circuit, in particular without removing the solvent cartridge.

Gas can be introduced under a pressure higher than the atmospheric pressure into the flow of cleaning solvent circulating in the ink circuit.

In all the above discussed cases, a gas-solvent mixture is formed, for example a circulation of alternating volumes 401 of gas and of volumes 402 of solvent in a duct 400 (FIG. 11A, or "slug flow"), each of said volumes being less than 1 $cm^3$, possibly forming a diphasic or biphasic mixture of said gas and said solvent (for example 90% of solvent and 10% gas, or between 80% and 95% of solvent and between 20% and 5% of gas) which is efficient to clean the circuit; alternatively, it can be a mixture of gas in solvent like for example on FIG. 11B (bubbles of gas 404 being in suspension in a solvent flow 406 or "emulsion").

The alternative pumping of solvent and air generates pressure surges or pulses or bumps of the pump(s) which contribute to an efficient cleaning of the ducts of the circuit.

Dirty solvent can be recovered in a separate tank 390 through an extra valve 391. This dirty solvent can be reused in the main tank 80 when there is a need to dilute ink contained therein, for example by pumping part of said solvent by pump 331, through an extra duct 392 and an extra valve 393.

Figure 5B:
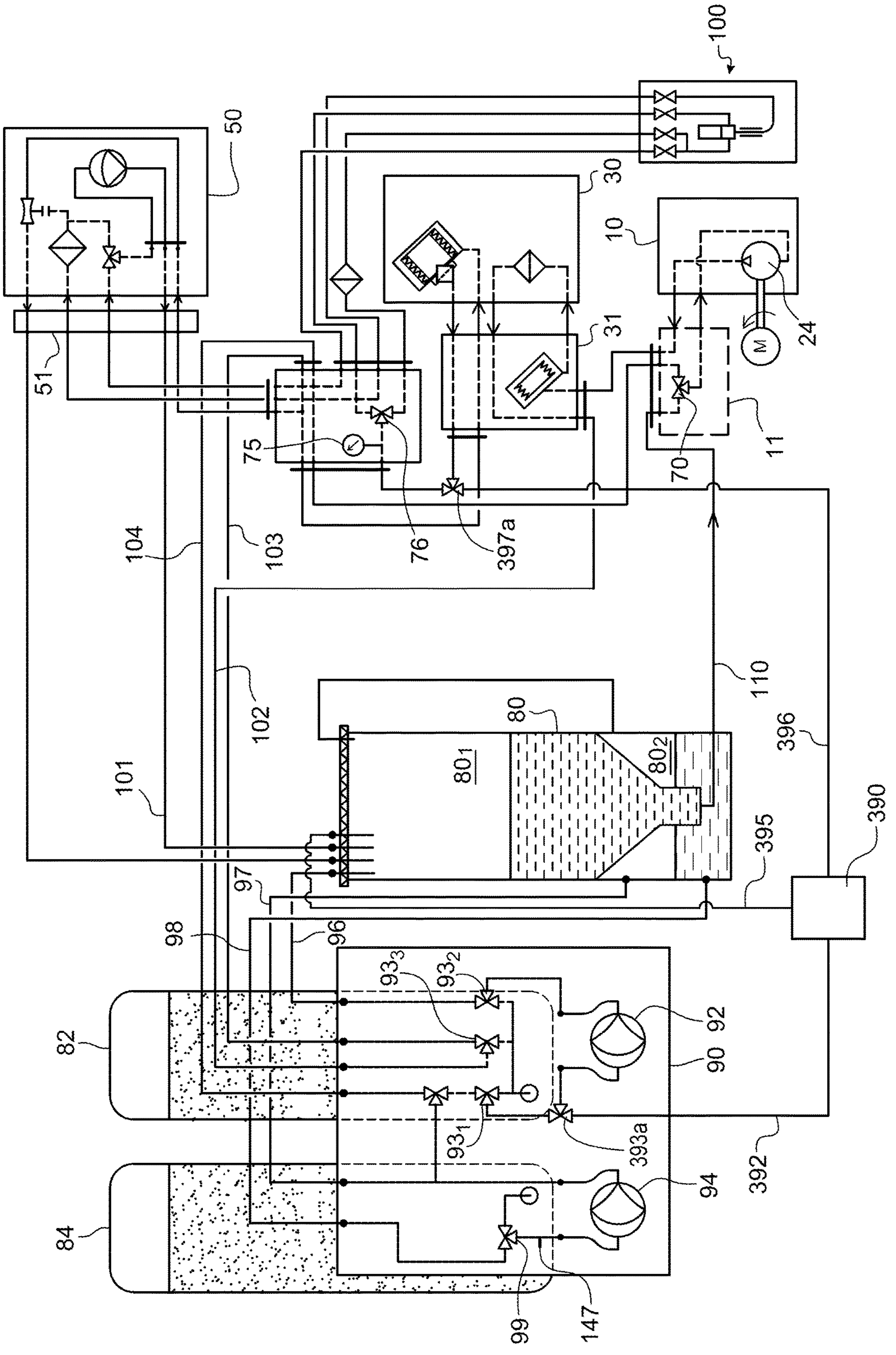

This other cleaning process, without removing cartridges 82, 84 can be applied to a circuit like illustrated on FIG. 5B, in which reference numbers identical to those of FIG. 5A designate the same technical means.

Gas is for example introduced upstream of pump 94 through a lateral duct 147. Alternatively, compressed gas can be introduced downstream of a pump, for example with a device as explained in connection with FIGS. 7B-7E (described below).

Dirty solvent can be recovered in a separate tank 390. With respect to FIG. 5A, the circuit of FIG. 5B contains additional valves 393*a* and 397*a* in order to recover dirty fluid in tank 390 and to be able to pump said dirty fluid therefrom and reuse it in the main tank 80 (in case there a need to dilute the ink contained therein).

Preferred embodiments of cleaning processes of the circuits of FIGS. 7A and 5B, without removing cartridges 82, 84, can comprise at least one of:

- an initial step of circulating gas in at least part of the circuit, which allows recovering ink in the main tank 80; the further steps of the cleaning process comprise circulating gas and solvent, as explained above, in at least part of the circuit, dirty fluid being recovered in tank 390, through adapted control of the valves of the circuit;
- a drying step, which can be performed at the end of the cleaning process, for example by circulating gas in all or part of the circuit, for example compressed gas and/or heated gas; gas can be heated by circulating it over heating means, for example one or more resistors, for example before being injected into the circuit. A drying step allows disassembling one or more of fluidic components like one or more valve(s) and/or one or more pump(s) and/or one or more filter(s) or damper(s) without any ink or solvent spillage.

Figure 7B:
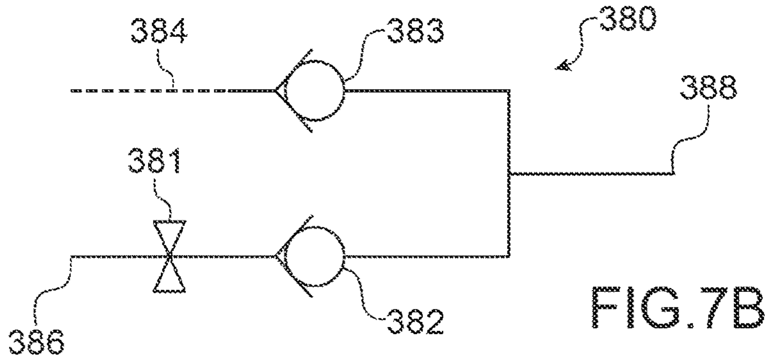
FIGS. 7B and 7C show a device to implement an embodiment of a flushing or cleaning method according to the invention, without (FIG. 7B) and with (FIG. 7C) a pump.

FIG. 7B shows a device 380 which can be used to perform an embodiment of a cleaning process according to the invention, without removing solvent cartridge 84.

It comprises a valve 381 and a non-return valve 382 in series, both being mounted in parallel to a non-return valve 383.

A gas, for example from a compressor (not represented on the figure) can be introduced through end 386 and then through valves 381 and 382; the other end 384 of the device, upstream of non-return valve 383 can be connected to the outlet of a pump, for example pump 320 or pump 339 of FIG. 7A.

Thus gas, for example compressed gas, can be introduced into the circuit, alternatively with solvent or simultaneously to a solvent flow, forming an alternation of gas and solvent or a flow of a mixture, possibly a diphasic mixture, of solvent and gas. The gas can be air.

The device 380 can be permanently in the circuit, for example downstream or at the outlet of a pump 320 (as illustrated on FIG. 7C), the end 386 being closed by a removable plug 387, the ends 384 and 388 being connected to the circuit.

Figure 7C:
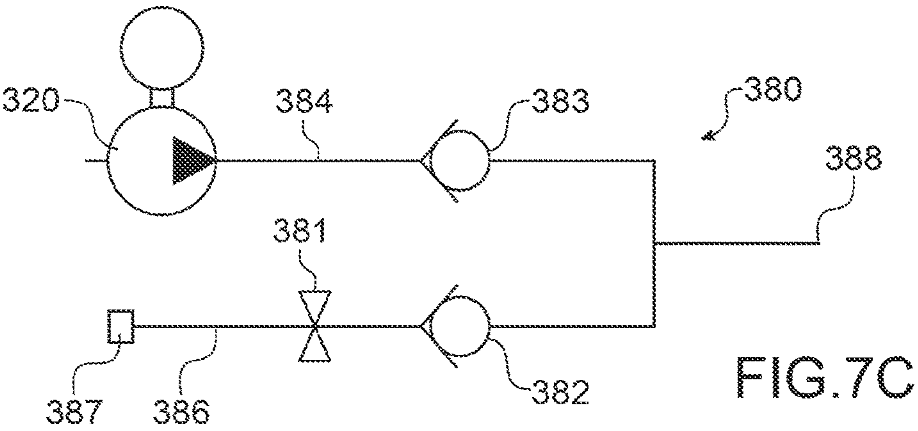
Figure 7D:
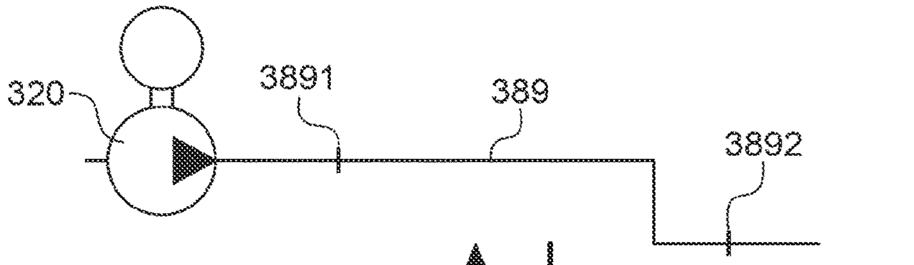
FIGS. 7D and 7E show how a device to implement an embodiment of a flushing or cleaning method according to the invention can be mounted in an ink circuit.
Figure 7E:
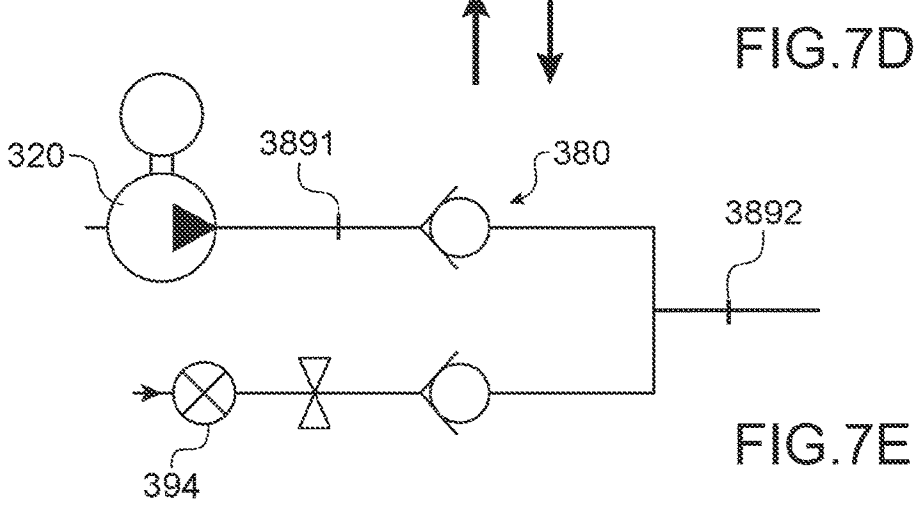

Alternatively, as illustrated on FIGS. 7D and 7E, the device 380 can be temporarily mounted in the circuit for cleaning purposes and removed from the circuit after cleaning; for example, it replaces a removable duct section 389 of the circuit. The removable section is coupled by coupling flanges 3891 and 3892, which can be disassembled and replaced by the device 380 which has similar coupling flanges 3891' and 3892'. A compressor 394 can be connected to the free end 386 of the device 380 to inject compressed gas, for example compressed air. After cleaning, the device 380 can be disassembled and removed from the circuit and replaced by section 389.

This other cleaning method and/or the device of FIG. 7B or 7C can be applied to the circuit of FIG. 5A or 5B or 7A or 7F (described below), allowing the introduction of gas, for example compressed gas, at various locations of the circuit, preferably downstream or at the outlet of one or more pump(s), alternatively to solvent or into a flow of solvent to form a solvent—gas mixture. Thus, a cleaning process of the circuit of any of the above-mentioned figures can be performed, in particular for the circuit of FIGS. 5A, 5B and 7A without removing solvent cartridge 84.

Any of the above cleaning methods can be applied to the preparation of a new ink jet printer just after manufacturing or building of a new printer. Indeed, the ink circuit of a new printer may contain residual solid particles which can be eliminated by a cleaning process as described above. Solvent containing solid particles is then sent in a waste tank or filtered before being reused in the ink circuit.

Any of the above cleaning methods can also be applied to a circuit not comprising removable cartridges 82, 84, for example a circuit as illustrated on FIG. 7A in which the solvent and ink tanks 314, 80 are replenished by an operator.

Figure 7F:
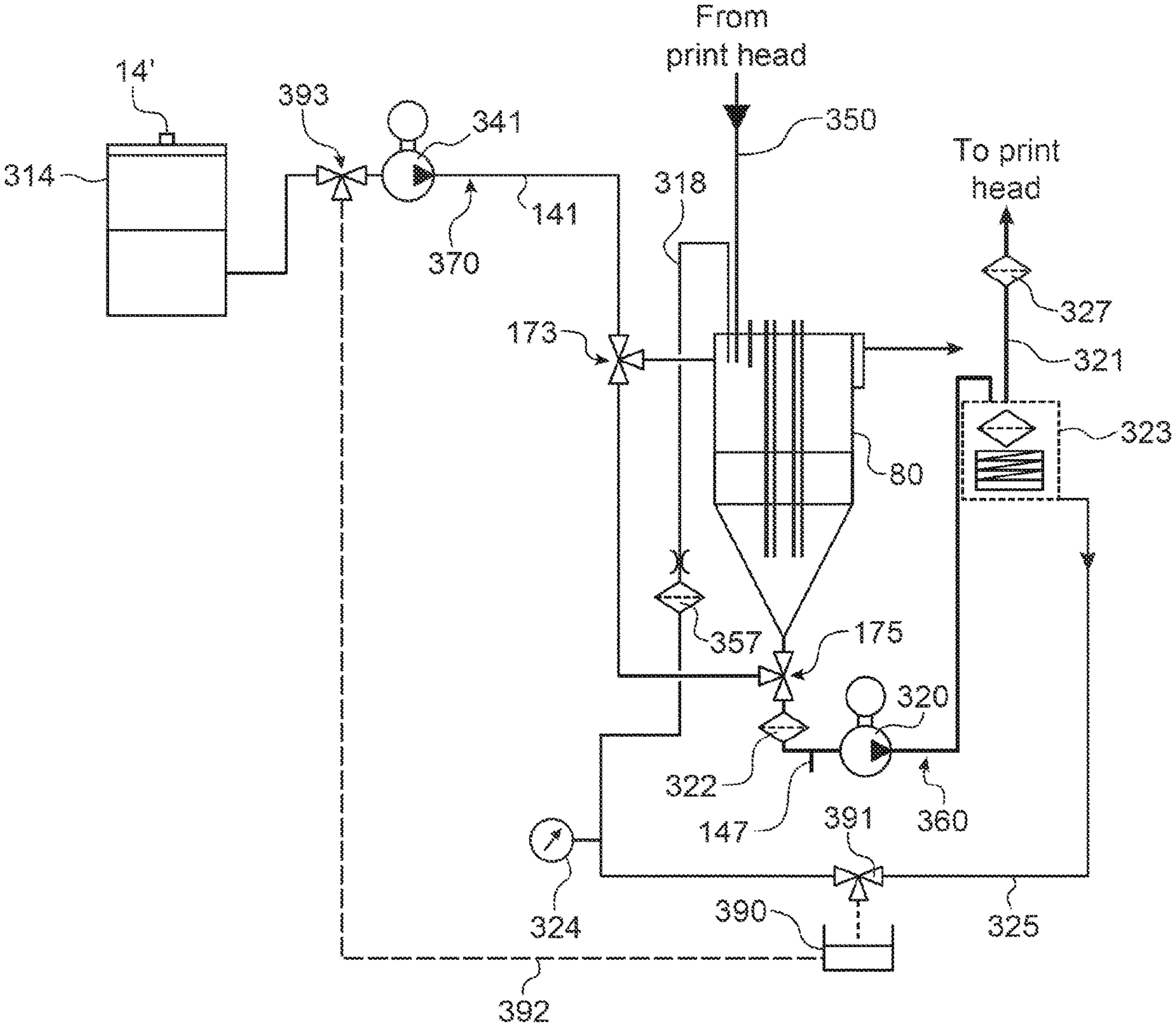
FIG. 7F shows another fluid circuit to illustrate another flushing or cleaning method according to the invention.

An example of such circuit is illustrated on FIG. 7F, on which the reference numbers are the same as on FIG. 7A; this circuit further comprises 3-way valves 173, 175 to send solvent downstream of the reservoir, said solvent being pumped by pump 320; gas, for example air, can be pumped from a lateral duct (or the main duct may have "T" shape), for example at 147 or 360 or 370 (or upstream of pump 341) on FIG. 7F or gas under pressure (higher than the atmospheric pressure) can be introduced into the circuit) at 147 or 360 or 370 on FIG. 7F; solvent is pumped from solvent tank or reservoir 314 and the dirty solvent which was used to clean the circuit can be collected in an extra tank 390 after opening a 3-way valve 391. The dirty solvent can be reused by injecting part of it into the main ink tank 80, when there is a need to dilute ink contained therein.

Air, or, more generally, a gas, can be introduced into the ink circuit of FIG. 7F at specific locations, upstream (from lateral duct 147) of one or more pumps 320, 341 or at the outlet or downstream of one or more of said pumps as indicated on FIG. 7F by arrow 360, resp.370, in particular if gas is introduced under pressure. Compressed gas can be provided by a compressor. The device 380 of FIGS. 7B-7E can be used in combination with the circuit of FIG. 7F, for example downstream of any of pumps 320, 341.

The introduction of gas creates a gas-solvent mixture, for example a circulation of alternating volumes 401 of gas and of volumes 402 of solvent in a duct 400 (FIG. 11A, or "slug flow"), each of said volumes being for example less than 1 $cm^3$, possibly forming a diphasic or biphasic mixture of said gas and said solvent (for example between 80% and 95% of solvent and 20% to 5% of gas) which is efficient to clean the circuit; alternatively, it can be a mixture of gas in solvent like for example on FIG. 11B (bubbles of gas 404 being in suspension in a solvent flow 406 or "emulsion"). The alternative pumping of solvent and air creates pressure surges or pulses or bumps of the pump(s) which contribute to an efficient cleaning of the ducts of the circuit.

It is preferable to avoid any interference of the gas with the pump 320 or 341; for this reason, a non-return valve can be mounted at the outlet of said pump(s). Thus, a gas can be introduced under a pressure higher than the atmospheric pressure into the flow of cleaning solvent circulating in the ink circuit. This creates a gas-solvent mixture, possibly a diphasic mixture of said gas and said solvent (for example 90% of solvent and 10% gas or between 80% and 95% of solvent and between 20% and 5% of gas) which is efficient to clean the circuit.

The device 380 of FIGS. 7B-7E can be used in combination with the circuit of FIG. 7F, for example downstream of any of pumps 320, 341.

In preferred embodiments of a cleaning process of the circuit of FIG. 7F:

an initial step of circulating gas in at least part of the circuit allows recovering ink which is sent to the main tank 80; the further steps of the cleaning process comprise circulating gas and solvent, as explained above, in at least part of the circuit, dirty fluid being recovered in tank 390, through adapted control of the valves of the circuit;

and/or a drying step can be performed at the end of the cleaning process, for example by circulating gas in all or part of the circuit, for example compressed gas and/or heated gas; gas can be heated by circulating it over heating means, for example one or more resistors, for example before being injected into the circuit. A drying step allows disassembling one or more of fluidic components like one or more valve(s) and/or one or more pump(s) and/or one or more filter(s) or damper(s) without any ink or solvent spillage.

A circuit like illustrated on FIG. 7F, without removable cartridges, may contain removable single-block assemblies or modules, like modules 10, 30, 50 described above, in which case the already mentioned advantages (in particular in terms of clean disassembling of said modules) apply and step S10 (FIG. 6) can be implemented.

Another embodiment of a flushing or cleaning process according to the invention can be applied to an ink circuit of a CIJ printer, for example an ink circuit according to the invention, in particular according to any of the above-described circuits (FIGS. 5A, 5B, 7A, 7F).

It comprises a step of circulating or flowing gas in at least part of the circuit or in the whole circuit; ink is thus flushed and removed from said part of the circuit or from said circuit and can be recovered, for example in the main tank 80.

Depending on the circuit:

air can be introduced by removing a cartridge, for example a solvent cartridge, and pumping air through the solvent cartridge connection means or receiving means;

or air, or, more generally, a gas, can be introduced into the ink circuit at specific locations, for example:

upstream of one or more pumps 94 (FIGS. 5A, 5B), 320, 341 (FIGS. 7A, 7F), for example as indicated on these FIG. 5A, 5B, 7A or 7F by reference numbers 147, 149;

or downstream or at the outlet of one or more pumps, for example as indicated on FIG. 7A or 7F by arrow 360, resp. 370, in particular if said gas is compressed, for example if it is provided by a compressor. In order to avoid any interference of the gas with the pump 320, resp. 341, a non-return valve can be mounted at the outlet of the pump close to which the compressed gas is introduced.

Gas can be introduced into the circuit at any of the above locations for example through a side duct laterally connected to the main duct (or the main duct has a "T" shape) and possibly an additional valve (not represented). FIGS. 7B-7E give examples of a tool for introducing gas directly into the circuit, in particular without removing a cartridge.

Ink is thus eliminated from the part(s) of the circuit which have been cleaned.

The process can be followed by disassembling or removing from the circuit at least one part which was cleaned according to said above process, for example:

one or more removable module or single—block assembly or component as already described above, for example the first removable module or single—block assembly 10, and/or the second removable module or single—block assembly 30 and/or the third removable module or single—block assembly 50 described in this application;

and/or one or more valve(s) and/or one or more pump(s) and/or one or more filter(s) or damper(s).

Preferably a flushing or cleaning process to the invention ends with a drying step of the part of the hydraulic or fluid circuit which has been cleaned. For example, the cleaning process can include a final step of pumping gas and sweeping that part of said circuit with said gas.

In particular, if a module, for example like any of the above-described first, second or third module, must be disassembled and removed from the circuit, a cleaning process of the fluid path inside of said module can be performed according to the invention, ending with a drying step of said fluid path. The dry module can then be removed without any fluid dropping from the device.

A "dry" module or a component of a fluid circuit as mentioned in this application or according to the invention also includes any module or a component which has been cleaned and contains less than a maximum volume of fluid.

Indeed, some residual amount of solvent may remain in any of the removable modules 10, 30, 50 after cleaning and drying but this amount is minor and can be trapped in the filter(s) of the module 30, 50 (in particular if the filter comprises absorbent materials) or does not prevent from disassembling the module in good conditions, with a minimum spillage or dripping.

For example, the modules may have an internal fluid volume comprised between 20 $cm^3$ and 150 $cm^3$. Tests were made with the circuit of FIG. 5A, comprising a cleaning process of the whole circuit according to the invention, followed by a drying step.

A remaining volume of liquid (solvent) of:

3.5 $cm^3$ was measured in module 24 (the internal maximum volume of fluid in this module about 50 $cm^3$);

13 $cm^3$ was measured in module 30 (the internal maximum volume of fluid in this module about 150 $cm^3$);

2 $cm^3$ was measured in module 50 (the internal maximum volume of fluid in this module is about 20 $cm^3$).

Thus, after cleaning and drying, more than 85% or 90% of the initial volume of solvent has been eliminated and less than about 15% or 10% of the initial volume remains in the module or the component. Most of the liquid which remains in module 30 or 50 is trapped in the filter(s) of this module.

A cabinet (also called console or body of the printer) for an ink jet printer comprising a fluid circuit as described in this application is illustrated on FIG. 8A (front side).

The cabinet can contain three sub-assemblies:

an ink circuit 4, preferably in the lower part of the cabinet, containing notably the circuit for conditioning the ink and solvent, as well as reservoirs for the ink and the solvent (in particular, the reservoir to which the ink recovered by the gutter is bought back); said ink circuit allows firstly the supplying of ink to the head at stable pressure and of adequate quality, and secondly the taking in charge of the ink recovered from the print head that is not used for printing; for a circuit implementing cartridges 82, 84, means 112*c*, 114*c* of fluidic connection, already described above, are for connection of said cartridges, these means 112*c*, 114*c* comprising for example a cannula;

a controller 5, which can be located in the upper part of the cabinet, comprising the commands and control electronics, or controller, capable of managing the sequencing of actions and of conducting processing to permit the actuation of the different functions of the ink circuit and the head; in particular the controller 5 can control the opening and closing of the valves and/or the pumping steps to implement any embodiment of a cleaning process as disclosed above;

an interface 6 which can comprise visualisation means or a screen and which provides the operator with the means to set the printer in operation and to be informed of the functioning thereof.

In other words, the body 3 can comprises 2 sub-assemblies: at the top part the electronics, electrical supply and operator interface; and in the lower part an ink circuit supplying the head with ink under pressure and providing a negative pressure for recovery of the ink not used by the head.

As can be seen on FIG. 8A, the lower part of the cabinet can comprise the appropriate ink cartridge receiving portion 82*a* and solvent cartridge receiving portion 84*a* (on FIG. 8A, both cartridges are unplugged); it also comprises at least part of the ink circuit 4, including the pump module 10, the filter module 30 and the recovery module 50. The other parts of the circuit of FIGS. 5A and 5B are located in the back of the cabinet and cannot be seen on FIG. 8A.

As can be seen on FIG. 8A, the filter module 30 is preferably inclined with respect to a horizontal plane, so that pigments from a pigment ink cannot sediment.

The 3 modules are accessible from the front side of the printer, so that they can be easily disassembled from the circuit by an operator, independently of each other.

Figure 8B:
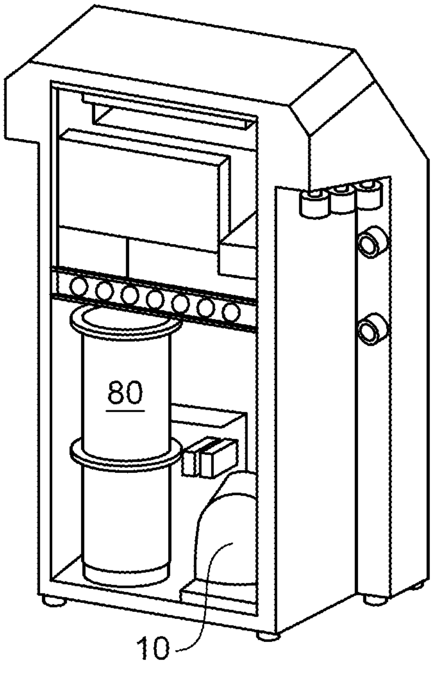
FIG. 8B shows a rear view of a cabinet of an ink-jet printer which can be used in an embodiment of the invention or to which the invention may apply.

A rear view of the cabinet is illustrated on FIG. 8B, showing the main reservoir 80 and a portion of the pump module 10.

The ducts, valves and the other pumps of the circuit are not shown on FIGS. 8A-B, but are also included in the hydraulic circuit.

The console is hydraulically and electrically connected to a print head (not represented on the figure) by an umbilical.

A gantry, not represented, makes it possible to install the print head facing a printing support 800 (see FIG. 9), which moves along a direction. This direction is perpendicular for example to an axis of alignment of the nozzles of the print head or to an axis of deviation of the drops (see deviated jet 9 on FIG. 9). The support moves along direction X. The position of the support with respect to the print head can be detected by a detector.

Such a printer can be integrated into a packaging machine.

FIG. 9 illustrates in particular a printing head which can be implemented in a CIJ printer according to the invention, for example of the multi-deflected type. It comprises:

- means 121, 123 for generating a drop jet called drop generator or stimulation body;
- means 164 (usually one or more electrodes) for charging the drops;
- means 162 (or "gutter") for recovering ink not used for printing;
- means 165 (usually one or more electrodes) for deflecting the charged drops for printing;
- possibly means for monitoring and controlling the drop deflection process (synchronization of drop formation with deflection commands).

In the drop generator 121 a cavity is supplied with an electrically conductive ink. This ink, held under pressure, by an ink circuit 4 external to the head, escapes from the cavity through at least one nozzle 6 thus forming at least one ink jet.

A periodical stimulation device 123 is associated with the cavity in contact with the ink upstream of the nozzle 6; it transmits to the ink a (pressure) periodical modulation which causes a modulation of velocity and jet radius from the nozzle. When the dimensioning of the elements is suitable, this modulation is amplified in the jet under the effect of surface tension forces responsible for the capillary instability of the jet, up to the jet rupture. This rupture is periodical and is produced at an accurate distance from the nozzle at a so-called «break» point 113 from the jet, which distance depends on the stimulation energy.

In the case where a stimulation device, called an actuator, comprises a piezoelectric ceramic in contact with the ink of the cavity upstream of the nozzle, the stimulation energy is directly related to the amplitude of the electrical signal for driving the ceramics. Other jet stimulation means (thermal, electro-hydrodynamic, acoustic, . . . ), can also be implemented in the frame of this invention. The stimulation using piezoelectric ceramics remains the preferred embodiment due to its efficiency and relative workability.

At its breaking point 113, the jet, which was continuous from the nozzle, is transformed into a train 111 of identical and evenly spaced apart ink drops. The drops are formed at a time frequency identical to the frequency of the stimulation signal; for a giving stimulation energy, any other parameter being otherwise stabilized (in particular ink viscosity), there is an accurate (constant) phase relationship between the periodical stimulation signal and the breaking instant, itself periodical and with a same frequency as the stimulation signal. In other words, to an accurate instant of the period of the stimulation signal corresponds an accurate instant in the separation dynamic of the jet drop.

Without further action (this is the case where drops are not used for printing), the drop train travels along a trajectory 7 collinear to the drop ejection axis (nominal trajectory of the jet) which joins, by a geometric construction of the printing head, the recovery gutter 162. This gutter 162 for recovering non-printed drops uptakes the ink not used which comes back to the ink circuit 4 to be recycled.

For printing, the drops are deflected and deviated from the nominal trajectory 7 of the jet. Consequently, they follow oblique trajectories 9 which meet the support to be printed 800 at different desired impact points. All these trajectories are in a same plane. The placement of the drops on the matrix of impacts of drops to be printed on the support, to form characters, for example, is achieved by combining an individual deflection of drops in the head deflection plane with the relative movement between the head and the support to be printed (generally perpendicular to the deflection plane). In the deviated continuous jet printing technology, the deflection is achieved by electrically charging drops and by passing them into an electric field. In practice, the means for deflecting drops comprise at least one charging electrode 164 for each jet, located in the vicinity of the break point 113 of the jet. It is intended to selectively charge each drop formed at a predetermined electrical charge value which is generally different from one drop to the other. To do this, the ink being held at a fixed potential in the drop generator 121, a voltage slot with a determined value, driven by the control signal, is applied to the charging electrode 164, this value being different at each drop period.

In the control signal of the charging electrode, the voltage application instant is shortly before the jet fractionation to take advantage of the jet electrical continuity and attract a given charge amount, which is a function of the voltage value, at the jet tip. This variable charge voltage affording the deflection is typically between 0 and 300 Volts. The voltage is then held during the fractionation to stabilize the charge until the detached drop is electrically insulated. The voltage remains applied for a certain time after the drop is detached to take break instant issues into account.

The drop deflecting means usually comprise a set of 2 deflection plates 165, located on either side of the drop trajectory upstream of the charging electrode. Both these plates are put to a high fixed relative potential producing an electrical field Ed substantially perpendicular to the drop trajectory, capable of deflecting the electrically charged drops which are engaged between the plates. The deflection amplitude is a function of the charge, the mass and the velocity of these drops.

A CIJ printhead may also comprise several ink-jet cavities for generating several ink jets, each cavity having its own nozzle and activation means or a same cavity may comprise several nozzles to produce several ink-jets. Charging electrodes and deviation electrodes can be associated with each jet as explained above.

The instructions for activating the means 121, 123 for producing ink jets and/or for activating the pumping means, for example of modules 10 or 50, and/or for opening and closing of valves in the path of the different fluids (ink, solvent, gas) and/or for applying the voltage(s) to the charge and/or the deviation electrode(s) can be sent by control means (also called "controller"). It is also these instructions that can make it possible to circulate ink under pressure in the direction of the means 121, 123 then to generate jets as a function of the patterns to be printed on a support 800.

These control means or controller are for example realised in the form of a processor or a microprocessor, or of an electrical or electronic circuit, adequately programmed, for example to implement a cleaning method according to the invention. In particular these control means can be programmed to control one or more pump and/or valve to circulate gas or gas and solvent in the circuit or in at least part of the circuit.

The control means may also be programmed to assure the memorisation of data, for example measurement data of ink levels in one or more reservoirs, and their potential processing.

These control means or controller can also be programmed to read one or more identifier(s) of one or more module(s) or single-block assembl(y)ies according to the invention and to identify said module(s) or single-block assembl(y)ies, which information can be displayed or processed.

Printers according to the invention are industrial printers, for example which have the ability to print on surfaces which are not flat, for example cables or bottles or cans. Another aspect of such printers is that the distance between the printing head and the substrate which must be printed is higher than in conventional desk printers. For example, that distance is at least 5 mm, for example between 10 mm and 30 mm.

The invention claimed is:

1. A cleaning process for cleaning at least one part of a hydraulic circuit of a continuous inkjet printer, said hydraulic circuit comprising a pump, a solvent tank and an ink tank, and hydraulic connections for sending ink and/or solvent to a print head, said cleaning process comprising:

removing a cartridge from a first cartridge connection, wherein said first cartridge connection and a second cartridge connection are both configured for supplying ink and/or solvent to said hydraulic circuit;

operating said pump to pump gas from said first cartridge connection while said cartridge is removed, said pump being part of said hydraulic circuit; and flowing or circulating said gas through at least one part of said hydraulic circuit and forcing ink from said at least one part of said hydraulic circuit into a second cartridge connected to the second cartridge connection.

2. The cleaning process according to claim 1, wherein said cartridge is a solvent cartridge, said process comprising unplugging said solvent cartridge from said first cartridge connection and pumping air from said first cartridge connection into said hydraulic circuit.

3. The cleaning process according to claim 1, said gas being compressed gas.

4. The cleaning process according to claim 1, wherein an ink cartridge is connected to said second cartridge connection, said cleaning process comprising unplugging said ink cartridge from said second cartridge connection, replacing said ink cartridge with said second cartridge and recovering ink in said second cartridge.

5. The cleaning process according to claim 1, comprising alternatively or simultaneously circulating said gas and clean solvent through said at least one part of said hydraulic circuit and recovering a mixture of at least said clean solvent and said ink in said second cartridge or in said ink tank.

6. The cleaning process according to claim 1, comprising at least one of:

alternatively circulating or sending volumes of said gas and solvent;

forming a mixture of solvent and said gas.

7. The cleaning process according to claim 1, comprising pumping said gas in said circuit, at atmospheric pressure, at a location fluidly connected to an inlet of the pump.

8. The cleaning process according to claim 1, comprising injecting compressed gas in said circuit, from at least one of:

a compressor;

a location fluidly connected to an outlet of the pump.

9. The cleaning process according to claim 1, wherein said pump is at least one of a solvent pump for pumping solvent or a pressure pump for pumping ink from said ink tank.

10. The cleaning process according to claim 1, said cleaning process ending with a drying step of said at least part of a hydraulic circuit.

11. The cleaning process according to claim 1, said hydraulic circuit comprising at least one removable single-block assembly, said cleaning process comprising cleaning said at least one removable single-block assembly.

12. A process for maintaining a hydraulic circuit of a continuous inkjet printer, comprising at least one removable single-block assembly, said process comprising:

a) performing a cleaning process for cleaning said at least one removable single-block assembly according to claim 11;

b) removing and possibly replacing said at least one removable single-block assembly.

13. A continuous inkjet printer, comprising:

an ink circuit, a print head connected to the ink circuit via a flexible umbilical cable containing firstly hydraulic connections to bring printing ink from the ink circuit to the print head and send ink to be recovered from the print head towards said ink circuit, and secondly electrical connectors;

a controller controlling said hydraulic circuit to implement a process according to claim 1.

* * * * *